US011297503B2

(12) United States Patent
Johansson et al.

(10) Patent No.: US 11,297,503 B2
(45) Date of Patent: Apr. 5, 2022

(54) SECURITY FOR POSITIONING WITHOUT CIPHERING

(71) Applicant: TELEFONAKTIEBOLAGET LM ERICSSON (PUBL), Stockholm (SE)

(72) Inventors: Nicklas Johansson, Brokind (SE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 121 days.

(21) Appl. No.: 16/766,937

(22) PCT Filed: Nov. 17, 2018

(86) PCT No.: PCT/IB2018/059076
§ 371 (c)(1),
(2) Date: May 26, 2020

(87) PCT Pub. No.: WO2019/106478
PCT Pub. Date: Jun. 6, 2019

(65) Prior Publication Data
US 2021/0037388 A1 Feb. 4, 2021

Related U.S. Application Data

(60) Provisional application No. 62/592,325, filed on Nov. 29, 2017.

(51) Int. Cl.
*H04L 29/06* (2006.01)
*H04W 12/104* (2021.01)
(Continued)

(52) U.S. Cl.
CPC ....... *H04W 12/104* (2021.01); *H04W 12/122* (2021.01); *H04W 12/30* (2021.01); *H04W 64/00* (2013.01); *H04W 80/02* (2013.01)

(58) Field of Classification Search
CPC ... H04W 12/04; H04W 12/122; H04W 12/30; H04W 64/00
See application file for complete search history.

(56) References Cited

U.S. PATENT DOCUMENTS 8,385,289 B2 *  2/2013  Landais ............... H04W 4/02
                                                     370/331
9,154,907 B2 * 10/2015  Edge .................. H04W 4/02
(Continued)

OTHER PUBLICATIONS

3GPP TS 49.031 V14.2.0 (Sep. 2017), 3rd Generation Partnership Project; Technical Specification Group Radio Access Network; Location Services (LCS); Base Station System Application Part LCS Extension (BSSAP-LE) (Release 14), the whole document.
(Continued)

*Primary Examiner* — Hosuk Song

(57) ABSTRACT

A wireless device (and method of) and a network node (and method of) are described herein for improving security for positioning without ciphering. In one embodiment, the wireless device is configured to: receive, from a network node, a paging request for a positioning event and a subsequent RRLP PDU; and perform, in response, an MTA procedure comprising a plurality of instances. When performing each instance, the wireless device transmits, to the network node, a RLC data block comprising at least a first field indicating a position of the instance in a sequence of the plurality of instances, and a second field indicating whether the instance is a last instance in the sequence of the plurality of instances. The network node upon receiving the RLC data block will be able to confirm whether the MTA procedure has been compromised by a fake wireless device.

22 Claims, 17 Drawing Sheets

(51) Int. Cl.
  *H04W 12/122*  (2021.01)
  *H04W 12/30*  (2021.01)
  *H04W 64/00*  (2009.01)
  *H04W 80/02*  (2009.01)

(56) References Cited

U.S. PATENT DOCUMENTS

| | | | | |
|---|---|---|---|---|
| 9,363,781 | B2* | 6/2016 | Won | H04W 60/00 |
| 9,549,289 | B2* | 1/2017 | Edge | H04W 4/02 |
| 9,973,978 | B2* | 5/2018 | Mahmood | H04W 36/0022 |
| 10,231,200 | B2* | 3/2019 | Eriksson | H04W 56/0065 |
| 10,281,559 | B2* | 5/2019 | Diachina | H04W 24/02 |
| 10,379,199 | B2* | 8/2019 | Diachina | G01S 5/06 |
| 10,382,968 | B2* | 8/2019 | Johansson | H04W 64/00 |
| 10,477,502 | B2* | 11/2019 | Johansson | H04W 28/24 |

OTHER PUBLICATIONS

3GPP TS 44.060 V15.0.0 (Jun. 2018), 3rd Generation Partnership Project; Technical Specification Group Radio Access Network; General Packet Radio Service (GPRS); Mobile Station (MS)—Base Station System (BSS) interface; Radio Link Control / Medium Access Control (RLC/MAC) protocol (Release 15), the whole document.

NOKIA, NOKIA Shanghai Bell, "Security Enhancement for MTA positioning procedure", 3GPP TSG RAN WG6 #7, R6-180047(Revision of R6-180022), Athens, Greece, Feb. 26-Mar. 2, 2018, Agenda item 5.3.2, the whole document.

"Transmission Control Protocol"—Wikipedia, Nov. 28, 2017, retrieved from the Internet on Dec. 18, 2018 at https://en.wikipedia.org/wiki/Transmission_Control_Protocol.

Ericsson LM: "New Work Item on Positioning Enhancements for GERAN", 3GPP TSG RAN Meeting #72, RP-161260 (revision of RP-161033), Busan, Korea, Jun. 13-16, 2016, the whole document.

Ericsson: "Positioning enhancements for GERAN—introducing Timing Advance trilateration", 3GPP TSG RAN#72, RP-161034, Busan, Korea, Jun. 13-16, 2016, the whole document.

NOKIA: "On Security of the MTA Method for Position Estimation", 3GPP TSG RAN WG6 #4, R6-170200, Hangzhou, P.R. China, Agenda Item 6.1.1, May 15-19, 2017, the whole document.

Ericsson: "Solving the Security Threat for MTA Positioning Methods", 3GPP TSG RAN WG6 #4, R6-170289, Hangzhou, P.R. China, Agenda Item 6.1.1, May 15-19, 2017, the whole document.

NOKIA: "Serving Cell TA Estimation for Multilateration Positioning", 3GPP TSG RAN WG6 #3, R6-170045, Athens, Greece, Agenda Item 6.1.1, Feb. 13-17, 2017, the whole document.

3GPP TS 44.060 V14.2.0 (Sep. 2017), 3rd Generation Partnership Project; Technical Specification Group Radio Access Network; General Packet Radio Service (GPRS); Mobile Station (MS)—Base Station System (BSS) interface; Radio Link Control / Medium Access Control (RLC/MAC) protocol (Release 14), the whole document.

3GPP TS 44.031 V14.2.0 (Sep. 2017), 3rd Generation Partnership Project; Technical Specification Group Radio Access Network; Location Services (LCS); Mobile Station (MS)—Serving Mobile Location Centre (SMLC) Radio Resource LCS Protocol (RRLP) (Release 14), the whole document.

* cited by examiner

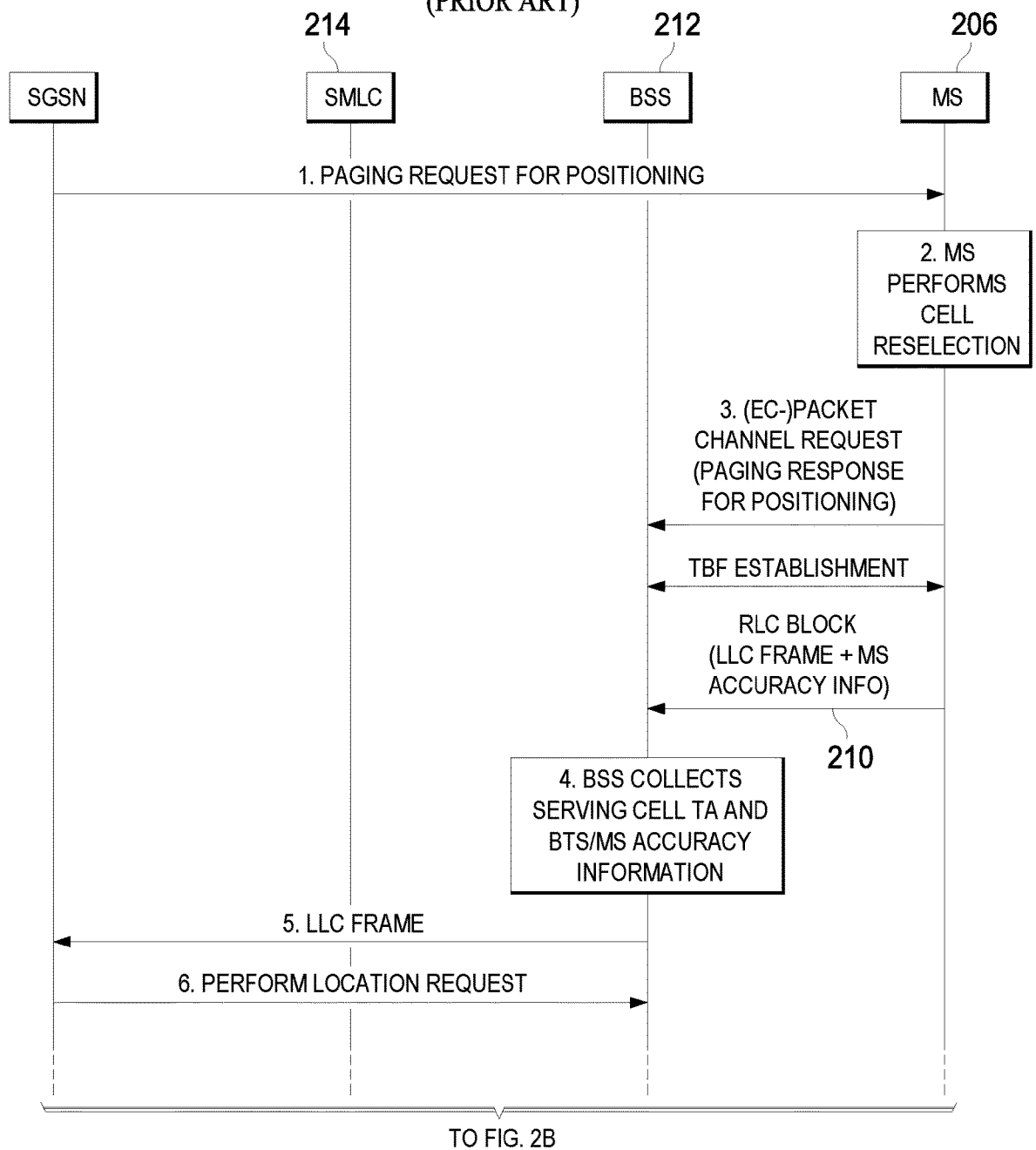

SECURITY FOR POSITIONING WITHOUT CIPHERING

CLAIM OF PRIORITY

This application is a national stage of International Application No. PCT/IB2018/059076, filed Nov. 17, 2018, which claims the benefit of priority to U.S. Provisional Patent Application No. 62/592,325, filed Nov. 29, 2017. The entire disclosure of each of these applications is fully incorporated herein by reference.

TECHNICAL FIELD

The present disclosure relates to a wireless device (and a method implemented thereby) and a network node (and a method implemented thereby) that improve security for positioning without ciphering. In one embodiment, the wireless device is configured to: (i) receive, from a network node (e.g., BSS), a paging request for a positioning event; and (ii) perform, in response to the paging request, a Multilateration Timing Advance (MTA) procedure comprising a plurality of instances wherein when performing each instance, the wireless device transmits, to the network node, a Radio Link Control (RLC) data block comprising at least a first field (e.g., 3-bit MTA Instance Field) and a second field (e.g., 1-bit Final MTA Access Indicator Field), the first field indicating a position of the instance in a sequence of the plurality of instances, and the second field indicating whether the instance is a last instance in the sequence of the plurality of instances. The network node upon receiving the RLC data block will be able to confirm whether or not the MTA procedure of the wireless device has been compromised by a different wireless device faking its identity.

BACKGROUND

At the 3rd-Generation Partnership Project (3GPP) Technical Specification Group (TSG) Radio Access Network (RAN) Meeting #72, a Work Item on "Positioning Enhancements for GERAN" was approved (see RP-161260, "New Work Item on Positioning Enhancements for GERAN", source Ericsson L M, Orange, MediaTek Inc., Sierra Wireless, Nokia, 3GPP TSG RAN #72, Busan, Korea, Jun. 13-16, 2016) wherein one candidate method for realizing improved accuracy when determining the position of a MS (mobile station) is Multilateration Timing Advance (MTA) (see RP-161034, "Positioning Enhancements for GERAN—introducing TA trilateration", source Ericsson, 3GPP TSG RAN #72, Busan, Korea, Jun. 13-16, 2016), which relies on establishing the MS position based on timing advance (TA) values in multiple cells.

TA is a measure of the propagation delay between a BTS (base transceiver station) and the MS, and since the speed by which radio waves travel is known, the distance between the BTS and the MS can be derived. Further, if TAs are measured to multiple BTSs and the positions of these BTSs (i.e., longitude and latitude) are known, the position of the MS can be derived. Measurement of a TA comprises the MS synchronizing to a neighbour BTS and transmitting a signal time-aligned with the timing of the BTS, where the time-alignment with the timing of the BTS is estimated by the MS. The BTS measures the time difference between its own time reference, and the timing of the received signal. This time difference is equal to two times the propagation delay between the BTS and the MS (one propagation delay of the BTS's synchronization signal to the MS, plus one equally large propagation delay of the signal transmitted by the MS back to the BTS).

Once the set of TA values are established, the position of the MS can be derived through the so called Multilateration Timing Advance procedure where the position of the MS is determined by the intersection of a set of hyperbolic curves associated with each BTS, as illustrated in FIG. 1 (PRIOR ART) which shows the MS 102, three BTSs $104_1$, $104_2$, and $104_3$, and three TA values $TA_1$, $TA_2$, and $TA_3$. The calculation of the position of the MS is typically carried out by the positioning node (e.g., the Serving Mobile Location Center (SMLC)), which implies that all of the derived timing advance and corresponding cell identity information needs to be sent to the positioning node that initiated the procedure (i.e., the serving SMLC).

At the 3GPP TSG RAN Working Group 6 (WG6) Meeting #3, some enhancements to the MTA procedure were proposed wherein the Base Station Subsystem (BSS) with sufficient accuracy estimates the Timing Advance value in the serving cell during the initiation of the Multilateration Timing Advance procedure (see R6-170045, "Serving Cell TA Estimation for Multilateration Positioning", source Nokia, 3GPP TSG WB6 #3, Athens, Greece, Feb. 13-17, 2017), as illustrated in the signal flow diagram in FIGS. 2A-2B (PRIOR ART). One of the proposed enhancements for allowing the BSS 212 to estimate Timing Advance value in the serving cell is to introduce a new Channel Request message in FIG. 2A's step 3 with an indication that the MS 206 is responding to a page for positioning. This allows the BSS 212 to use more advanced Timing Advance estimation algorithms such as oversampling and interpolation during the reception of the subsequent Radio Link Control (RLC) data block 210 (last part of FIG. 2A's step 3) containing the Logical Link Control (LLC) Protocol Data Unit (PDU) (the page response). It has furthermore been proposed that in FIG. 2B's step 10, the BSS 212 should also be able to estimate the Timing Advance value in the serving cell on reception of the (Extended Coverage) Packet Associated Control Channel ((EC-) PACCH) Packet Downlink Ack 230. The BSS 212 then sends in FIG. 2B's step 12 the timing advance along with BTS receiver accuracy and MS accuracy parameters to the SMLC 214 to update the serving cell related timing estimation before the MS 206 leaves the serving cell to perform the Multilateration Timing Advance procedure in additional cells.

There currently exist certain challenges for the MTA procedure. In this regard, potential security issues for the MTA procedure were explained in the 3GPP TSG RAN WB6 Meeting #4 (see R6-170200, "On Security of the MTA Method for Position Estimation", source Nokia, 3GPP TSG RAN WB6 #4, Hangzhou, P.R. China, May 15-19, 2017). One solution was described in R6-170289, "Solving the Security Threat for MTA Positioning Methods", source Ericsson, 3GPP TSG WB6 #4, Hangzhou, P.R. China, May 15-19, 2016, which proposed sending a set of random identifiers via secured LLC signalling to the MS to use them for multilateration access attempts, and was standardised in Rel-14 (i.e., 3GPP TS 44.060 v14.2.0 (August 2017), 3GPP TS 44.031 v14.2.0 (September 2017), and 3GPP TS 49.031 v14.2.0 (September 2017).

As discussed above, the MTA based positioning procedure estimates the position of the MS based on the timing advance estimated in multiple base stations. This procedure comprises the MS triggering the MTA radio access procedure in multiple cells which includes an access attempt followed by Temporary Block Flow (TBF) establishment for sending the Temporary Logical Link Identifier (TLLI) and other information of the MS. However, this radio access procedure does not have any additional security protection. Thus, it is possible for another MS faking its identity (referred to hereinafter as a "fake MS") to trigger the radio access procedure using the TLLI of the wanted MS (valid MS), which can result in wrong position estimation for the wanted MS. This problem was discussed during Rel-14 and the solution described in the next paragraph, which does not cover all deployment scenarios, however, was specified to resolve this issue.

As per the current solution in Rel-14 (i.e., 3GPP TS 44.060 v14.2.0 (August 2017), 3GPP TS 44.031 v14.2.0 (September 2017), and 3GPP TS 49.031 v14.2.0 (September 2017), security issues for MTA are treated as follows:

The SMLC includes a set of random identifiers to the Radio Resource Location services Protocol (RRLP) Multilateration Timing Advance Request message sent towards the MS.

The RRLP message is sent as LLC PDU towards the MS. Here the solution assumes that the Serving GPRS Support Node (SGSN) supports the LLC ciphering functionality and LLC ciphering is enabled.

The MS uses different random identifiers for each of the multilateration access attempts towards different base stations. As the processing of the timing advance, reported by the BSS, at the SMLC is linked to the received random identifier in the MTA radio access and the identifiers sent to the MS via a secured LLC link, it is not possible for a faked MS to perform an MTA access attempt using the TLLI received in the serving cell via unsecured signaling.

For the above solution to work, support of LLC ciphering functionality must be mandatory at the SGSN and MS. Without the support of LLC ciphering functionality, it is still possible for a fake MS to read the RRLP Multilateration Timing Advance Request message and use the given random identifiers in its MTA access attempt so that it can lead to wrong timing advance estimation and thus result in a wrong position estimation for the wanted MS.

Since LLC ciphering is not a mandatory feature for the GERAN core network, and in network deployments where LLC security is not activated, the above solution which is based on a set of random identifiers cannot solve the above described MTA security issue, because the fake MS also can receive the RRLP Multilateration Timing Advance Request message and can use the included random identifiers in its MTA related access attempts.

Moreover, LLC ciphering is considered as required functionality for Extended Coverage-GSM-Internet of Things (EC-GSM-IoT), but not for operation of Power Efficient Operation (PEO) devices. Nonetheless, the MTA based signalling procedure is applicable for both PEO and EC-GSM-IoT devices. Thus, in the case where LLC ciphering is not supported by PEO devices, it is also not possible to achieve the required security level using the above solution based on a set of random identifiers of the MTA feature as specified in Rel-14 (i.e., 3GPP TS 44.060 v14.2.0 (August 2017), 3GPP TS 44.031 v14.2.0 (September 2017), and 3GPP TS 49.031 v14.2.0 (September 2017). In view of the foregoing, there is a need for an additional enhancement to the above-described solution in order to address the problem associated with the fake MS for different network deployment configurations. This need and other needs are addressed by the present disclosure.

SUMMARY

A wireless device (e.g., MS), a network node (e.g., BSS), and various methods for addressing the aforementioned need in the prior art are described in the independent claims. Advantageous embodiments of the wireless device, the network node, and the various methods are further described in the dependent claims.

In one aspect, the present disclosure provides a wireless device (e.g., mobile station) configured to interact with a network node (e.g., BSS). The wireless device comprises processing circuitry configured to cause the wireless device to perform a receive operation, a perform operation, and a transmit operation. In the receive operation, the wireless device receives, from the network node, a paging request for a positioning event and a subsequent Radio Resource Location Services Protocol (RRLP) Protocol Data Unit (PDU) (which includes a Multilateration Timing Advance Request Message). In the perform operation, the wireless device performs, in response to receiving the paging request and the RRLP PDU, an MTA procedure using a Radio Link Control (RLC) Data Block Method comprising a plurality of instances. In performing each instance, the wireless device transmits, to the network node, an RLC data block comprising a first field and a second field, the first field indicating a position of the instance in a sequence of the plurality of instances, and the second field indicating whether the instance is a last instance in the sequence of the plurality of instances. An advantage of this wireless device is that by transmitting the RLC data block it will enable the network node to confirm whether or not the MTA procedure of the wireless device has been compromised by a fake wireless device In another aspect, the present disclosure provides a method implemented by a wireless device (e.g., mobile station) configured to interact with a network node (e.g., BSS). The method comprising a receiving step, a performing step, and a transmitting step. In the receiving step, the wireless device receives, from the network node, a paging request for a positioning event and a subsequent Radio Resource Location Services Protocol (RRLP) Protocol Data Unit (PDU) (which includes a Multilateration Timing Advance Request Message). In the performing step, the wireless device performs, in response to receiving the paging request and the RRLP PDU, an MTA procedure using a Radio Link Control (RLC) Data Block Method comprising a plurality of instances. In performing each instance, the wireless device transmits, to the network node, an RLC data block comprising a first field and a second field, the first field indicating a position of the instance in a sequence of the plurality of instances, and the second field indicating whether the instance is a last instance in the sequence of the plurality of instances. An advantage of this method implemented by the wireless device is that by transmitting the RLC data block it will enable the network node to confirm whether or not the MTA procedure of the wireless device has been compromised by a fake wireless device.

In yet another aspect, the present disclosure provides a network node (e.g., BSS) configured to interact with a wireless device (e.g., mobile station). The network node comprises processing circuitry configured to cause the network node to perform a transmit operation and a receive operation. In the transmit operation, the network node transmits a paging request for a positioning event and a subsequent Radio Resource Location Services Protocol (RRLP) Protocol Data Unit (PDU) (which includes a Multilateration Timing Advance Request Message) to a wireless device, the positioning event comprising the wireless device performing a MTA procedure using a Radio Link Control (RLC) Data Block Method comprising a plurality of instances. In the receive operation, the network node receives, from the wireless device, an RLC data block comprising a first field and a second field, the first field indicating a position of the instance in a sequence of the plurality of instances, and the second field indicating whether the instance is a last instance in the sequence of the plurality of instances. An advantage of this network node is that by receiving the RLC data block it will enable the network node to confirm whether or not the MTA procedure of the wireless device has been compromised by a fake wireless device.

In yet another aspect, the present disclosure provides a method implemented by a network node (e.g., BSS) configured to interact with a wireless device (e.g., mobile station). The method comprises a transmitting step and a receiving step. In the transmitting step, the network node transmits a paging request for a positioning event and a subsequent Radio Resource Location Services Protocol (RRLP) Protocol Data Unit (PDU) (which includes a Multilateration Timing Advance Request Message) to a wireless device, the positioning event comprising the wireless device performing a MTA procedure using a Radio Link Control (RLC) Data Block Method comprising a plurality of instances. In the receiving step, the network node receives, from the wireless device, an RLC data block comprising a first field and a second field, the first field indicating a position of the instance in a sequence of the plurality of instances, and the second field indicating whether the instance is a last instance in the sequence of the plurality of instances. An advantage of this method implemented by the network node is that by receiving the RLC data block it will enable the network node to confirm whether or not the MTA procedure of the wireless device has been compromised by a fake wireless device.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings:

FIGS. 2A-2B (PRIOR ART) are illustrations of a signal flow diagram of a Multilateration Positioning procedure (this illustration is reproduced from R6-170045, "Serving Cell TA Estimation for Multilateration Positioning", source Nokia, 3GPP TSG WB6 #3, Athens, Greece, Feb. 13-17, 2017);

DETAILED DESCRIPTION

Figure 1:
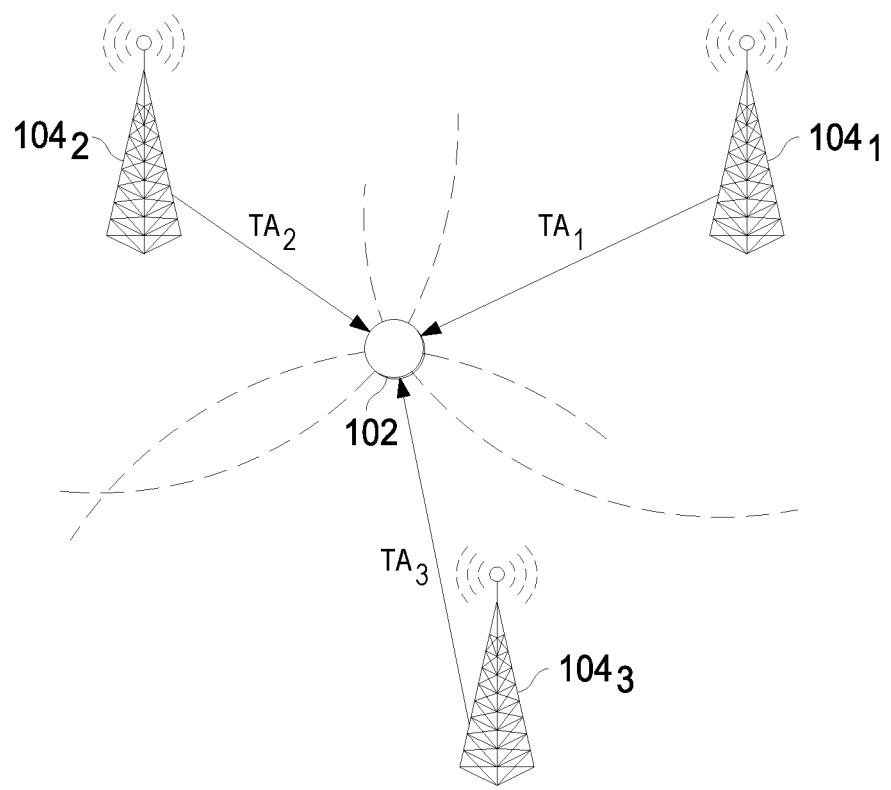
FIG. 1 (PRIOR ART) is an illustration of Multilateration involving three base stations associated with three timing advance values for a particular mobile station.
Figure 2B:
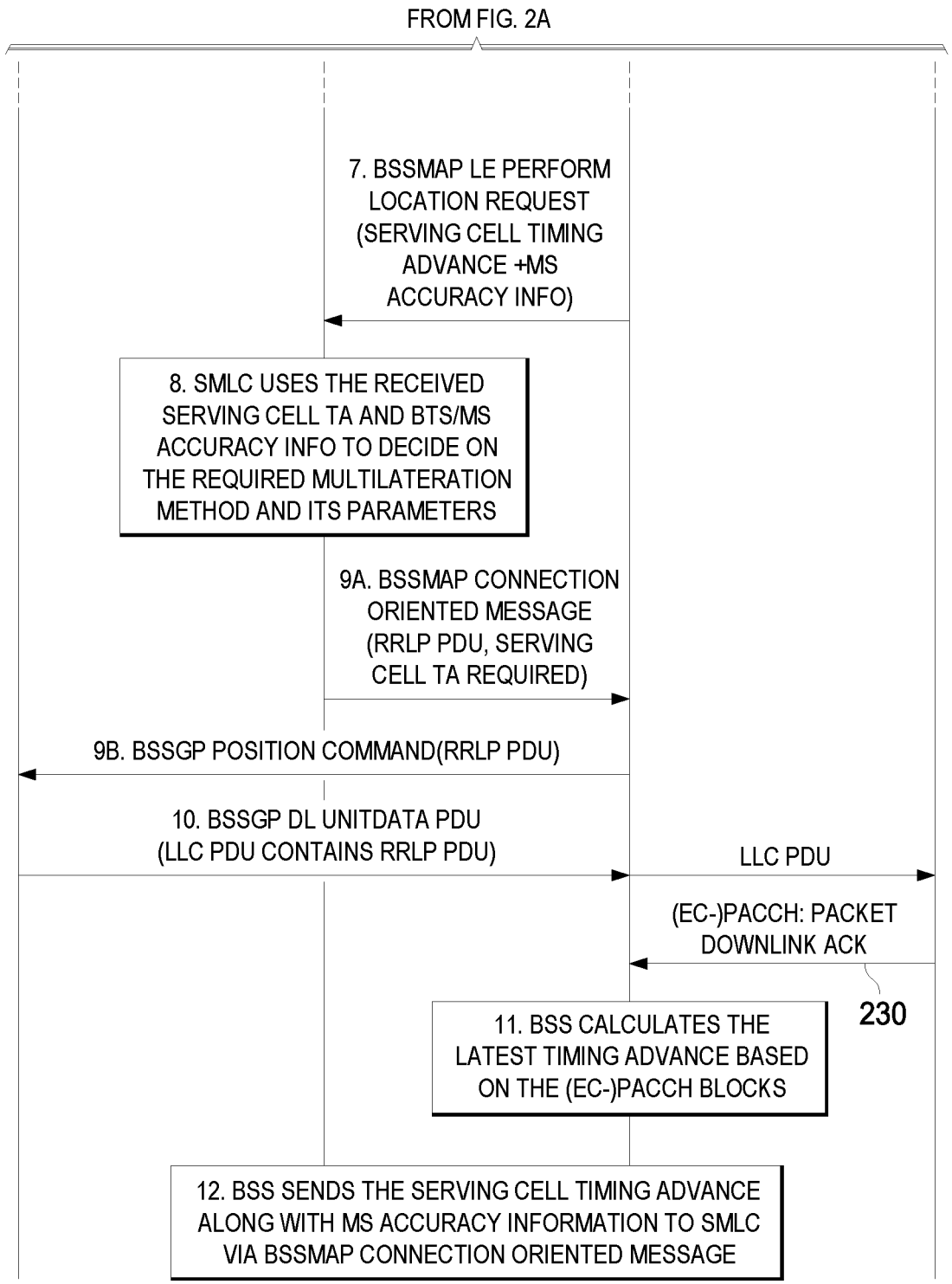
Figure 3A:
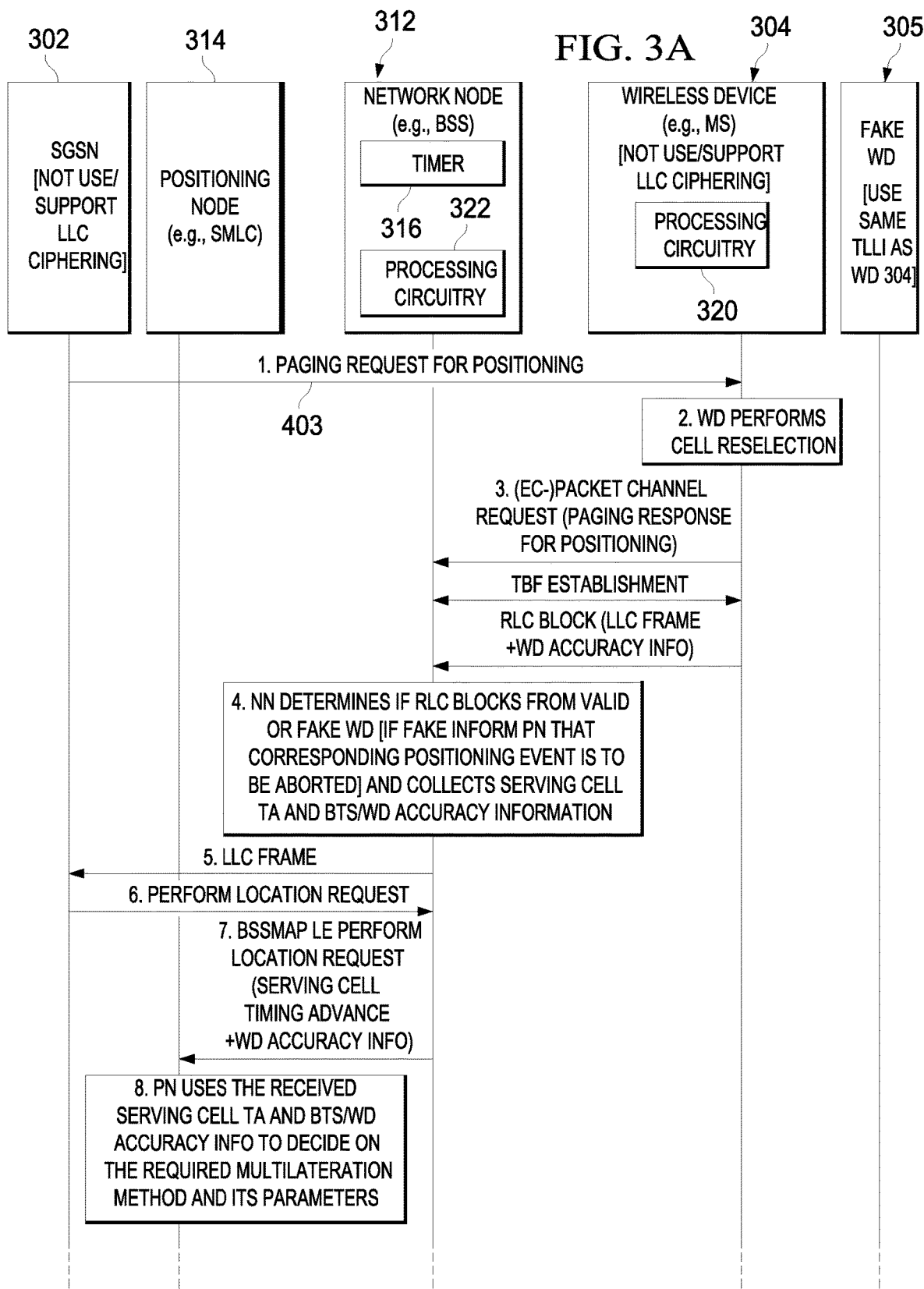
FIGS. 3A-3B are illustrations of a signal flow diagram of the Multilateration Positioning procedure shown in FIGS. 2A-2B which has been enhanced to address the problems in the prior art in accordance with an embodiment of the present disclosure.
Figure 3B:
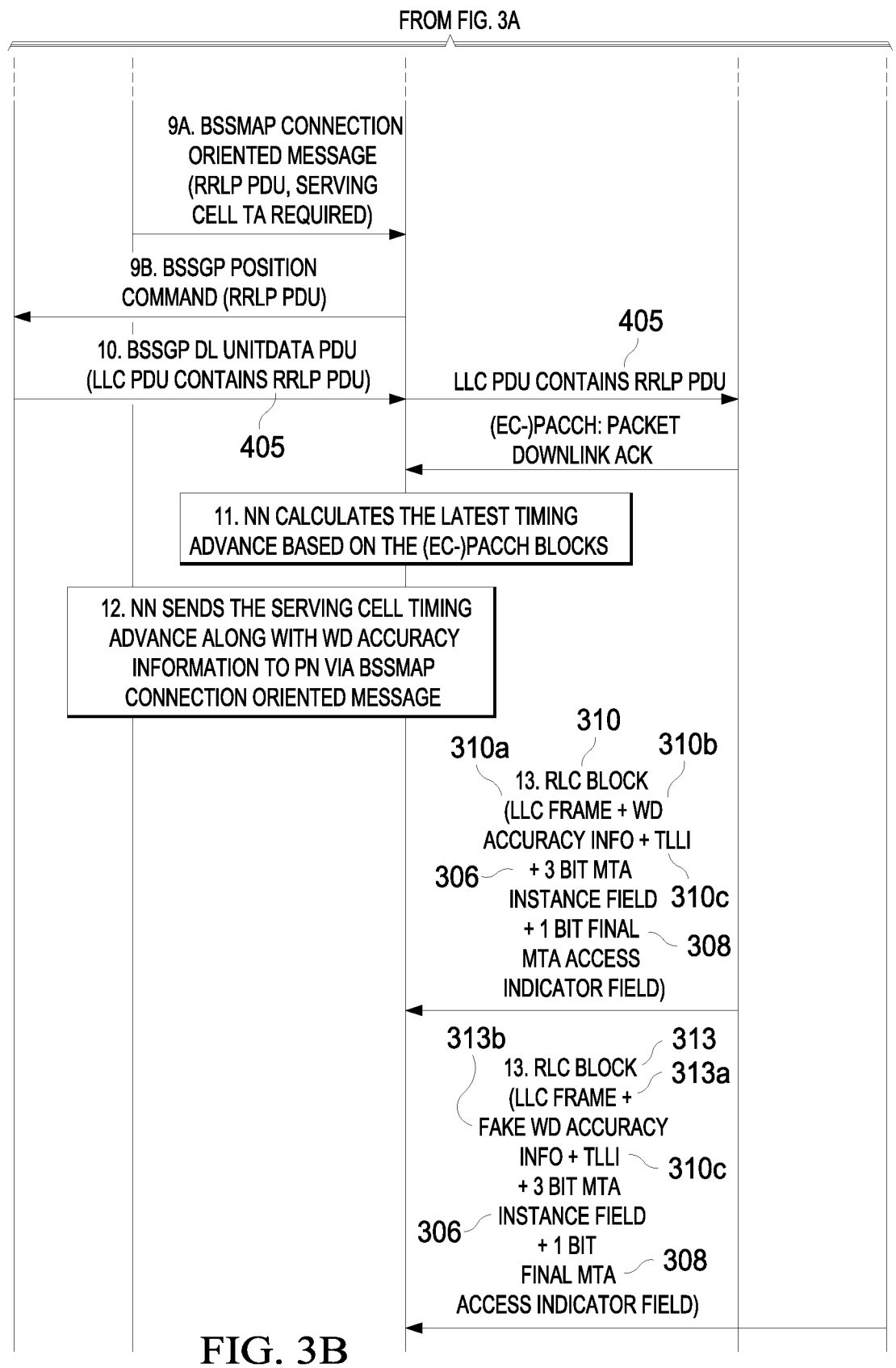

The present disclosure has certain aspects and embodiments described hereinafter which provide solutions to the aforementioned need or other challenges which are associated with the prior art. Referring to FIGS. 3A-3B, if the SGSN 302 and the wireless device (WD) 304 (e.g., MS 304) do not use or support LLC ciphering, then the integrity of the MTA procedure can be achieved with the following changes to the MTA radio access signalling procedure.

A 3 bit "MTA Instance" field 306 and a 1 bit "Final MTA Access Indicator" field 308 can be introduced within the RLC data block 310 sent by the wireless device 304 to the network node (NN) 312 (e.g., BSS 312) when using the RLC Data Block method to perform MTA (e.g., see FIG. 3B's step 13) (note: it is well known in view of section A.9.1 of 3GPP TS 44.031 V14.2.0 (September 2017) that the wireless device 304 will know that it is to perform a MTA positioning procedure using the RLC Data Block method after receiving the RRLP PDU 405 (which includes a "Multilateration Timing Advance Request" message) in FIG. 3B's step 10).

For a given positioning event, the "MTA Instance" field 306 is set to "0" when the wireless device 304 performs the first instance of the MTA procedure, set to "1" when the wireless device 304 performs the second instance, etc., and is set to "N" when the wireless device 304 performs the last instance of the MTA procedure for the current positioning event (i.e., there are no gaps in the value of the "MTA Instance" field 306 whenever the wireless device 304 performs a given positioning event).

The "Final MTA Access Indicator" field 308 is set to FALSE in each RLC data block 310 except when the wireless device 304 performs the last instance of the MTA procedure for the current positioning event when the "Final MTA Access Indicator" field 308 is set to TRUE in that that corresponding RLC data block 310.

This means that any transmission of an RLC data block 313 by a fake wireless device 305 (e.g., MS 305) (which uses the same TLLI as used by wireless device 304) will result in the network node 312 detecting for the wireless device 304 (i.e., but is actually wireless device 304 and fake wireless device 305 because, to the network node 312, the wireless device 304 and the fake wireless device 305 appear to be the same wireless device due to both using the same TLLI) (a) duplicate RLC data blocks 310 and 313 (i.e., an RLC data block 310 or 313 having the same value for the "MTA Instance" field 306 and the same value for the "Final MTA Access Indicator" field 308 as those of a previously received RLC data block 313 or 310); (b) an RLC data block 310 or 313 with the "MTA Instance" field 306 having a value that is greater than the value of the "MTA Instance" field 306 received in an RLC data block 313 or 310 for which the "Final MTA Access Indicator"=TRUE; or (c) an RLC data block 310 or 313 with "Final MTA Access Indicator"=TRUE for which the corresponding "MTA Instance" field 306 has the same value as that of an RLC data block 313 or 310 for which "Final MTA Access Indicator"=FALSE.

If (a), (b) or (c) occurs, then the network node 312 will not know which is the valid wireless device 304 and which is the fake wireless device 305 and so will abort the positioning event.

As soon as the network node 312 detects (a) or (c), it will realize the MTA procedure has been compromised and will abort the positioning event (i.e., the network node 312 will immediately tell the positioning node (PN) 314 (e.g., SMLC 314) that the corresponding positioning event is to be aborted).

To ensure that the network node 312 can detect when (b) occurs, the network node 312 waits a short period of time (e.g., 500 ms—see note about timer 316 in next bullet) after receiving an RLC data block 313 or 310 with "Final MTA Access Indicator"=TRUE. If no additional RLC data block 310 or 313 is received with a "MTA Instance" field 306 having a value that is greater than the value of the "MTA Instance" field 306 received in the RLC data block 313 or 310 for which the "Final MTA Access Indicator"=TRUE, then the network node 312 proceeds with the MTA procedure. Otherwise, the network node 312 will consider the MTA procedure to have been compromised and abort the positioning event.

It is to be noted that the value of the timer 316 can be fixed or be indicated using system information and shall reflect the worst case delay expected between any two consecutive RLC data block 310 transmissions made in the same or different cells by the wireless device 304 performing the MTA procedure using the RLC Data Block method.

A technical advantage of this enhancement to the MTA procedure is that in the absence of support for LLC PDU ciphering functionality there is an improved level of security (e.g., protection against a fake wireless device (e.g., MS)) which can be realized with the aforementioned changes to the existing MTA procedure.

Figure 4:
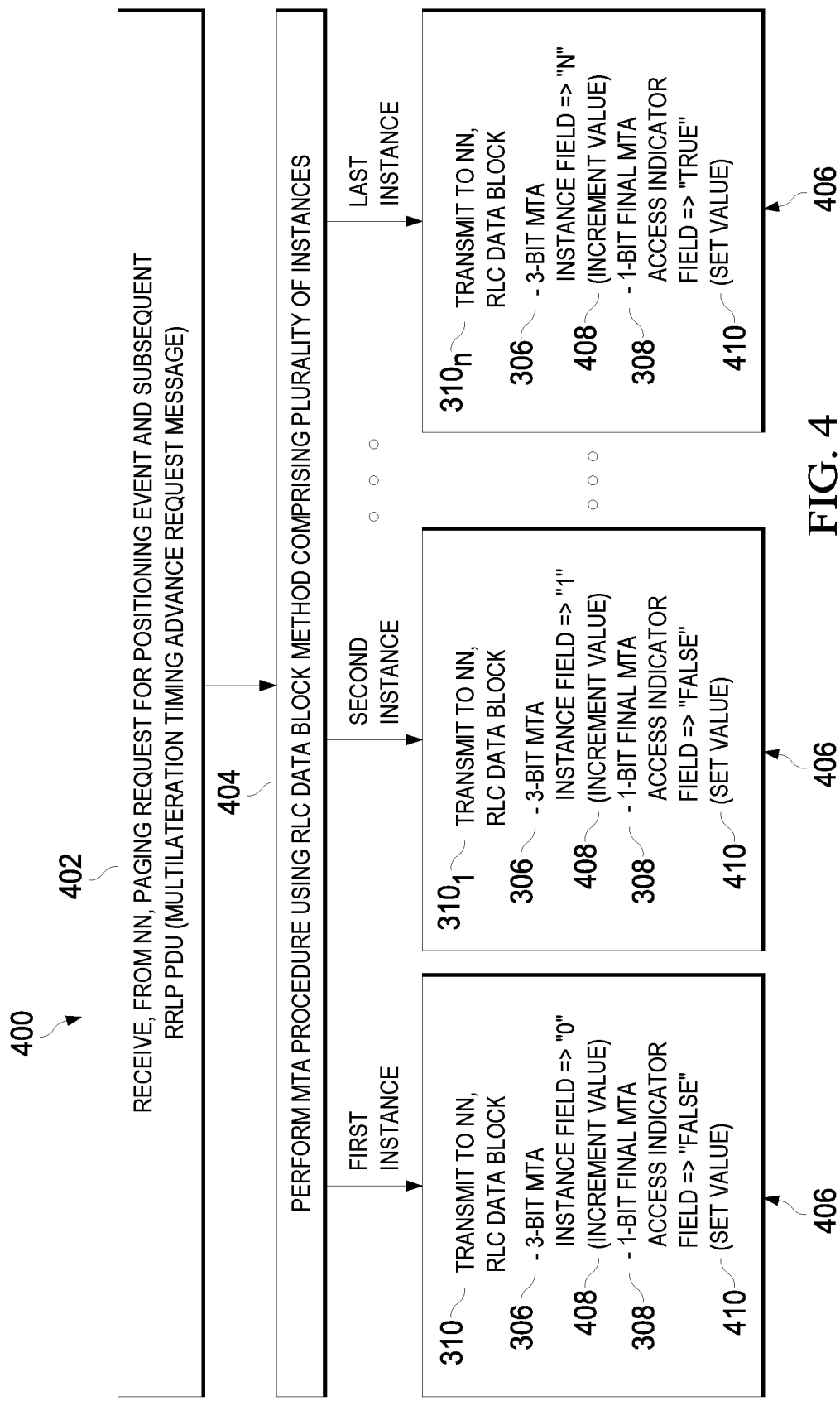
FIG. 4 is a flowchart of a method implemented in the wireless device (e.g., MS) in accordance with an embodiment of the present disclosure.

Referring to FIG. 4, there is a flowchart of a method 400 implemented in the wireless device 304 (e.g., MS 304) configured to interact with the network node 312 (e.g., BSS 312) in accordance with an embodiment of the present disclosure. At step 402, the wireless device 304, receives from the network node 312, a paging request 403 for a positioning event (see also FIG. 3A's step 1) and a subsequent RRLP PDU 405 (Multilateration Timing Advance Request message) (see also FIG. 3B's step 10). In response to receiving the paging request 403 and subsequent RRLP PDU 405, the wireless device 304 at step 404 performs a Multilateration Timing Advance (MTA) procedure using the RLC Data Block method comprising a plurality of instances (see also FIG. 3B's step 10 where the wireless device 304 receives the RRLP PDU 405 indicating it is to perform the MTA procedure using the RLC Data Block method with an improved level of security, for which the "Final MTA Access Indicator" field 308 and "MTA Instance" field 306 are to be included in the RLC data block 310 sent to the network node 312 as discussed next). The wireless device 304 in performing each instance of the MTA procedure wherein an improved level of security is applied will at step 406 transmit, to the network node 312, a RLC data block 310, $310_1 \ldots 310_n$ which comprises information such as a LLC frame 310a, wireless device (e.g., MS) accuracy information 310b, and TLLI 310c, plus the values in the new 3-bit MTA Instance field 306 and the new 1-bit Final MTA Access Indicator field 308 (see FIG. 3B's step 13—note only RLC data block 310 is shown there for clarity). For each transmission step 406, the wireless device 304 at step 408 increments a value of the 3-bit MTA Instance field 306 when performing each consecutive instance in the MTA procedure. For example, the wireless device 304 in transmitting the first RLC data block 310 would set to "0" the value of the 3-bit MTA Instance field 306. The wireless device 304 in transmitting the second RLC data block $310_1$ (not shown in FIGS. 3A-3B) would set to "1" the value in the 3-bit MTA Instance field 306. Finally, when the wireless device 304 performs the last instance of the MTA procedure for the current positioning event it will in transmitting the last RLC data block $310_n$ (not shown in FIGS. 3A-3B) set to "N" the value in the 3-bit MTA Instance field 306. It is to be noted that there are no gaps in the value of the MTA Instance field 306 whenever the wireless device 304 performs a given positioning event. Further, for each transmission step 406 the wireless device 304 at step 410 sets the value in the 1-bit Final MTA Access Indicator field 308 to FALSE in each RLC data block 310 and 310₁ except when the wireless device 304 performs the last instance of the MTA procedure for the current positioning event, in which case the wireless device 304 sets the value to TRUE in RLC data block 310n. A discussion is provided below with respect to FIGS. 6A-6C on how the network node 312 (e.g., BSS 312) can use the RLC data block 310 (for example) and in particular the values in the 3-bit MTA Instance field 306 and the 1-bit Final MTA Access Indicator field 308 to determine if the wireless device 304's MTA positioning event has been compromised or not by a fake wireless device 305.

Figure 5:
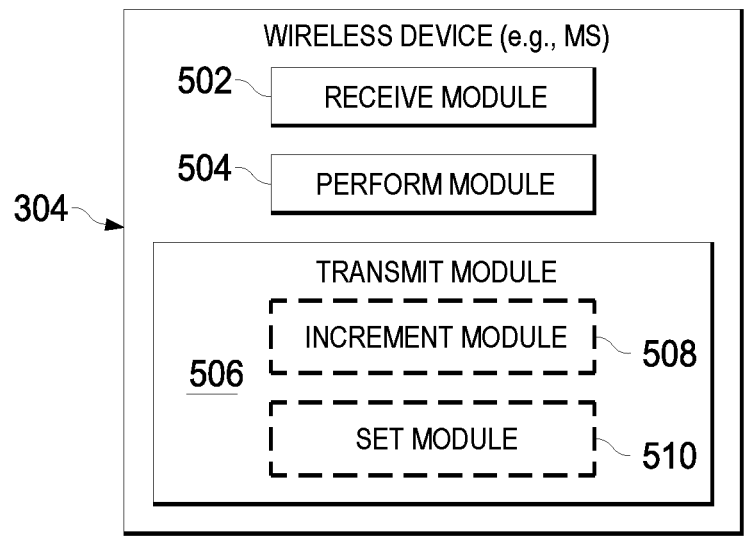
FIG. 5 is a block diagram illustrating a structure of the wireless device (e.g., MS) configured in accordance with an embodiment of the present disclosure.

Referring to FIG. 5, there is a block diagram illustrating structures of an exemplary wireless device 304 (e.g., MS 304) configured in accordance with an embodiment of the present disclosure. The wireless device 304 comprises a receive module 502, a perform module 504, and a transmit module 506 (which includes an increment module 508 and a set module 510). The receive module 502 is configured to receive, from the network node 312 (e.g., BSS 312), a paging request 403 for a positioning event (see also FIG. 3A's step 1) and a subsequent RRLP PDU 405 (Multilateration Timing Advance Request message) (see also FIG. 3B's step 10). In response to receiving the paging request 403 and the subsequent RRLP PDU 405, the perform module 504 is configured to perform a Multilateration Timing Advance (MTA) procedure using the RLC Data Block method comprising a plurality of instances. The perform module 504 in performing each instance of the MTA procedure will cause the transmit module 506 to transmit, to the network node 312, a RLC data block 310, 310₁ . . . 310ₙ which comprises information such as a LLC frame 310a, wireless device (e.g., MS) accuracy information 310b, and TLLI 310c plus the values in the new 3-bit MTA Instance field 306 and the new 1-bit Final MTA Access Indicator field 308 (see FIG. 3B's step 13—note only RLC data block 310 is shown for clarity). For each transmission, the increment module 508 is configured to increment a value of the 3-bit MTA Instance field 306 when performing each consecutive instance in the MTA procedure. For example, the increment module 508 before the transmission of the first RLC data block 310 would set to "0" the value of the 3-bit MTA Instance field 306. The increment module 508 before the transmission of the second RLC data block 310₁ (not shown in FIGS. 3A-3B) would set to "1" the value in the 3-bit MTA Instance field 306. Finally, the increment module 508 during the performance of the last instance of the MTA procedure for the current positioning event will before transmitting the last RLC data block 310 (not shown in FIGS. 3A-3B) set to "N" the value in the 3-bit MTA Instance field 306. It is to be noted that there are no gaps in the value of the MTA Instance field 306 whenever the wireless device 304 performs a given positioning event. Further, for each transmission, the set module 510 is configured to set the value in the 1-bit Final MTA Access Indicator field 308 to FALSE in each RLC data block 310 and 310₁ except when the wireless device 304 performs the last instance of the MTA procedure for the current positioning event, in which case the set module 510 sets the value to TRUE in RLC data block 310n. It should be appreciated that the wireless device 304 may also include other components, modules or structures which are well-known, but for clarity, only the components, modules or structures needed to describe the features of the present disclosure are described herein.

As those skilled in the art will appreciate, the above-described modules 502, 504, 506, 508 and 510 of the wireless device 304 may be implemented as suitable dedicated circuit. Further, the modules 502, 504, 506, 508 and 510 can also be implemented using any number of dedicated circuits through functional combination or separation. In some embodiments, the modules 502, 504, 506, 508 and 510 may even be combined in a single application specific integrated circuit (ASIC). As an alternative software-based implementation, the wireless device 304 may comprise processing circuitry 320 which may comprise a memory, and a processor (including but not limited to a microprocessor, a microcontroller or a Digital Signal Processor (DSP), etc.). The memory stores machine-readable program code executable by the processor to cause the wireless device 304 to perform the steps of the above-described method 400. In other embodiments, the wireless device 304 may also have a configuration as described hereinafter with respect to FIGS. 8-16).

Figure 6:
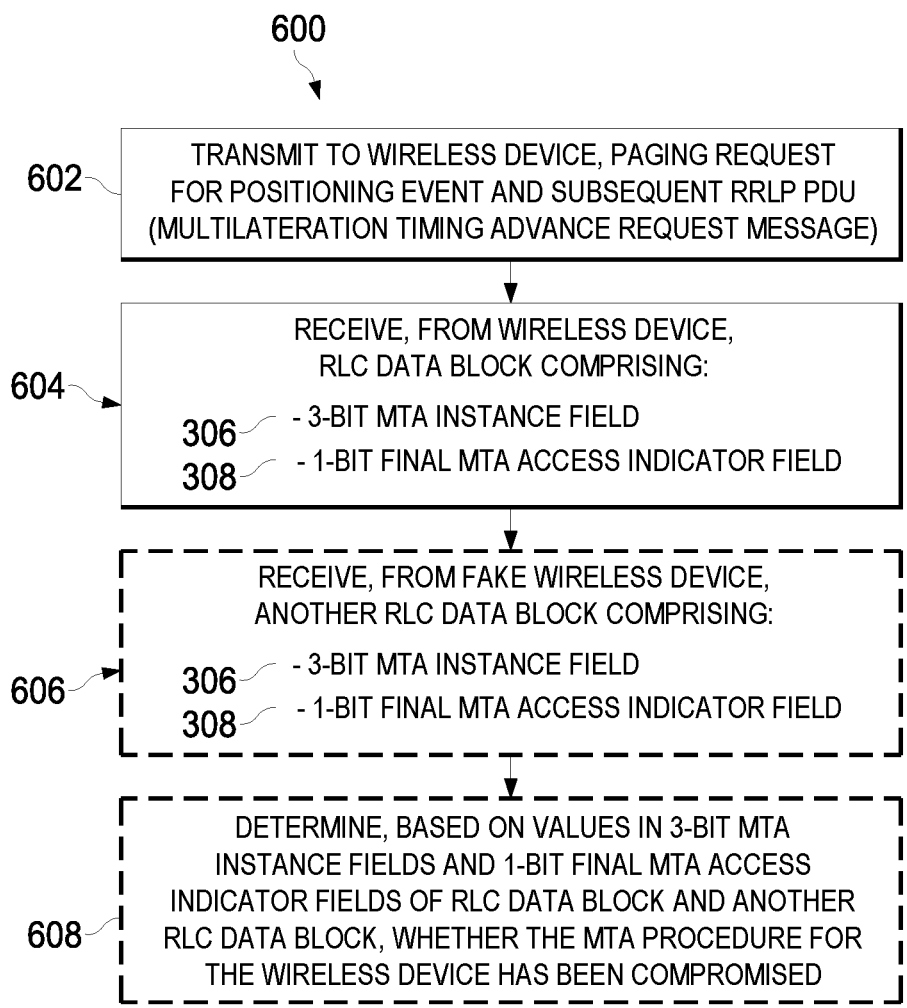
FIG. 6 is a flowchart of a method implemented in the network node (e.g., BSS) in accordance with an embodiment of the present disclosure.

Referring to FIG. 6, there is a flowchart of a method 600 implemented in the network node 312 (e.g., BSS 312) configured to interact with the wireless device 304 (e.g., MS 304) in accordance with an embodiment of the present disclosure. At step 602, the network node 312, transmits the paging request 403 for a positioning event to the wireless device 304 and a subsequent RRLP PDU 405 (Multilateration Timing Advance Request message) (see also FIG. 3B's step 10) (note: upon receiving the paging request 403 and the subsequent RRLP PDU 405, the wireless device 304 performs the positioning event which includes performing a MTA procedure using the RLC Data Block method comprising a plurality of instances). At step 604, the network node 312 receives, from the wireless device 304, the RLC data block 310 which comprises information such as an LLC frame 310a, wireless device (e.g., MS), accuracy information 310b, and TLLI 310c, plus the values in the new 3-bit MTA Instance field 306 and the new 1-bit Final MTA Access Indicator field 308. As described above, the 3-bit MTA Instance field 306 has a value which indicates a position of the instance in a sequence of the plurality of instances, and the 1-bit Final MTA Access Indicator field 308 has a value which indicates whether the instance is a last instance in the sequence of the plurality of instances. Although the wireless device 304 for clarity is described in this example as transmitting one RLC data block 310, it should be appreciated that the wireless device 304 transmits multiple RLC data blocks 310, 310₁ . . . 310ₙ during the performance of the positioning event (MTA procedure) which includes the 3-bit MTA Instance field 306 and the 1-bit Final MTA Access Indicator field 308 (note: the wireless device 304 transmits one RLC data block 310, 310₁ . . . 310ₙ in each cell it uses to perform the MTA procedure). At step 606, the network node 312 receives, from the fake wireless device 305 (e.g., MS 305) which used a same identifier 310c (e.g., TLLI 310c) as the wireless device 304, another RLC data block 313 which comprises information such as a LLC frame 313a, fake wireless device (e.g., MS) accuracy information 313b, and TLLI 310c (same as wireless device 304's TLLI 310c) plus the values in the new 3-bit MTA Instance field 306 and the new 1-bit Final MTA Access Indicator field 308 (note: the network node 312 can receive the another RLC data block 313 before or after receiving the RLC data block 310). At step 608, the network node 312 determines, based at least on values of the new 3-bit MTA Instance field 306 and the new 1-bit Final MTA Access Indicator field 308 in the received RLC data block 310 and the received another RLC data block 313 whether the MTA procedure of the wireless device 304 has been compromised. A discussion is provided next with respect to FIGS. 6A-6C which are used to describe three different ways that the network node 312 can perform step 608 (note: the network node 312 can use any one or all of these different ways to determine whether the MTA procedure of the wireless device 304 has been compromised).

Figure 6A:
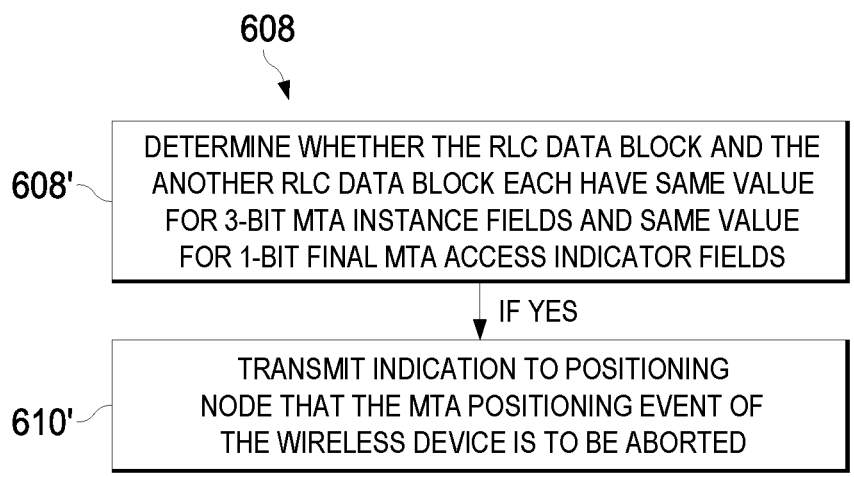
FIG. 6A is a flowchart illustrating one way to implement FIG. 6's step of determining whether the MTA procedure of the wireless device has been compromised in accordance with an embodiment of the present disclosure.

Referring to FIG. 6A, there is a flowchart illustrating steps of one way that the network node 312 can perform step 608 in accordance with an embodiment of the present disclosure. The network node 312 in determining whether the MTA procedure of the wireless device 304 has been compromised can at step 608' determine whether the received RLC data block 310 and the received another RLC data block 313 each have a same value for their respective 3-bit MTA Instance fields 306 and a same value for their respective 1-bit Final MTA Access Indicator fields 308, and wherein a determination that the received RLC data block 310 and the received another RLC data block 313 each have the same value for their respective 3-bit MTA Instance fields 306 and the same value for their respective 1-bit Final MTA Access Indicator fields 308 indicates that the MTA procedure of the wireless device 304 has been compromised. The network node 312 in response to determining that the MTA procedure of the wireless device 304 has been compromised at step 610' transmits an indication to a positioning node 314 (e.g., SMLC 314) that the positioning event of the wireless device 304 is to be aborted.

Figure 6B:
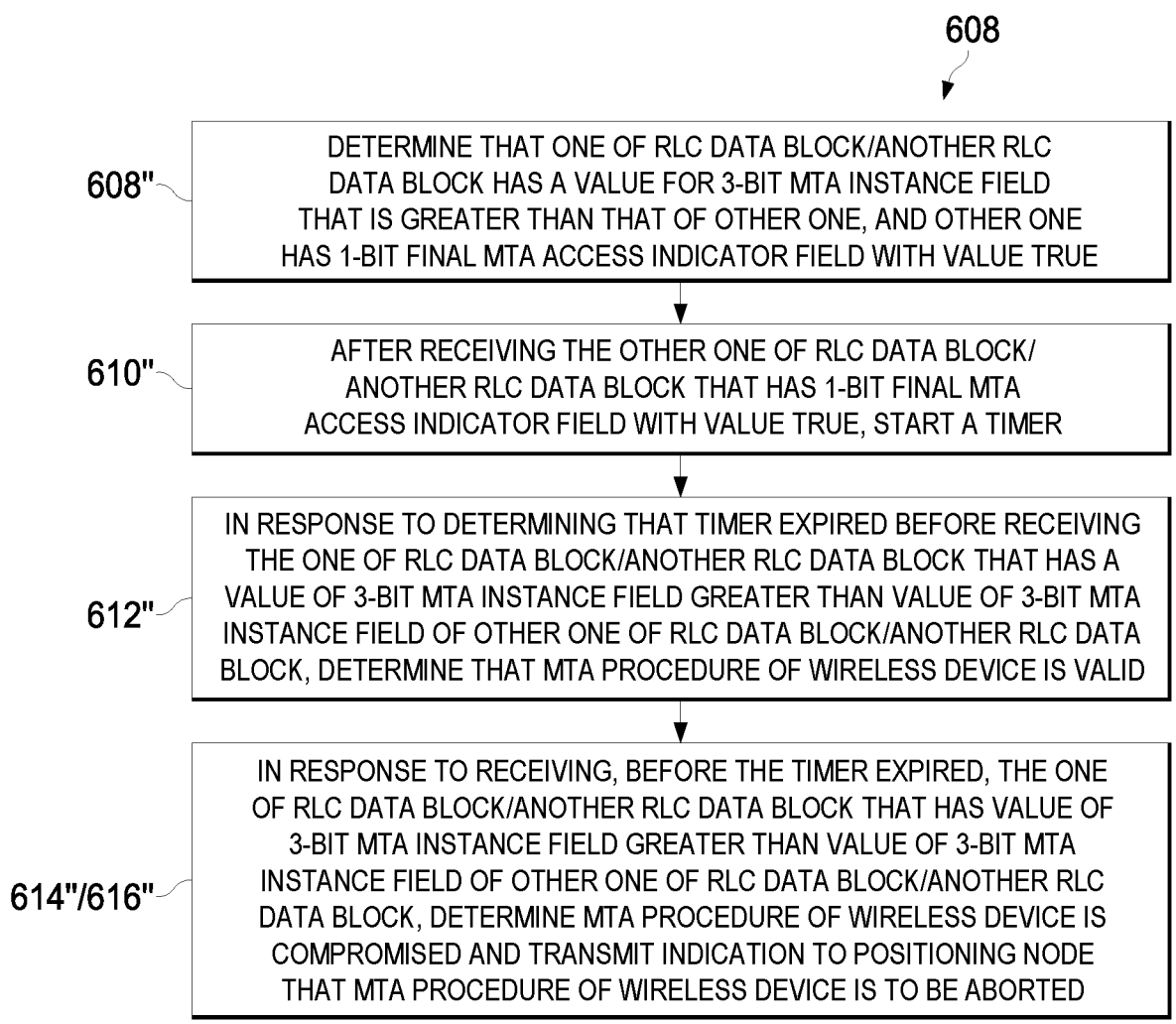
FIG. 6B is a flowchart illustrating another way to implement FIG. 6's step of determining whether the MTA procedure of the wireless device has been compromised in accordance with an embodiment of the present disclosure.

Referring to FIG. 6B, there is a flowchart illustrating steps of another way that the network node 312 can perform step 608 in accordance with another embodiment of the present disclosure. The network node 312 in determining whether the MTA procedure of the wireless device 304 has been compromised can at step 608" determine that one of the received RLC data block 310 or the received another RLC data block 313 has a value for the 3-bit MTA Instance field 306 that is greater than a value of the 3-bit MTA Instance field 306 of the other one of the received RLC data block 310 or the received another RLC data block 313, and where the 1-bit Final MTA Access Indicator field 308 of the other one of the received RLC data block 310 or the received another RLC data block 313 has a value of TRUE which indicates that instance was the last instance in the sequence of the plurality of instances. At step 610", the network node 312 after receiving the other one of the received RLC data block 310 or the received another RLC data block 313 that has the 1-bit Final MTA Access Indicator field 308 with the value of TRUE, starts a timer 316. At step 612", the network node 312 in response to determining that the timer 316 reached its expiration before receiving the one of the received RLC data block 310 or the received another RLC data block 313 that has the value for its 3-bit MTA Instance field 306 that is greater than the value of the 3-bit MTA Instance field 306 of the other one of the received RLC data block 310 or the received another RLC data block 313, determines that the MTA procedure of the wireless device 304 is valid (note: it should be appreciated that the aforementioned other one of the received RLC data block 310 or the received another RLC data block 313 is used in this example when comparing the received RLC data blocks 310 and 313 but in more general terms the network node 312 would upon receiving one RLC data block for a wireless device 304 or 305 having the identifier TLLI 310c will perform the above analysis per step 608" to compare that received RLC data block with all of the RLC data blocks previously received for a wireless device 304 or 305 having the same identifier TLLI 310c). At steps 614" and 616", the network node 312 in response to receiving, before the timer 316 reached its expiration, the one of the received RLC data block 310 or the received another RLC data block 313 that has the value for its 3-bit MTA Instance field 306 that is greater than the value of the 3-bit MTA Instance field 306 of the other one of the received RLC data block 310 or the received RLC another data black 313, determines (FIG. 6C's step 614") that the MTA procedure of the wireless device 304 has been compromised, and transmits (FIG. 6C's step 616") an indication to the positioning node 314 (e.g., SMLC 314) that the positioning event of the wireless device 304 is to be aborted.

Figure 6C:
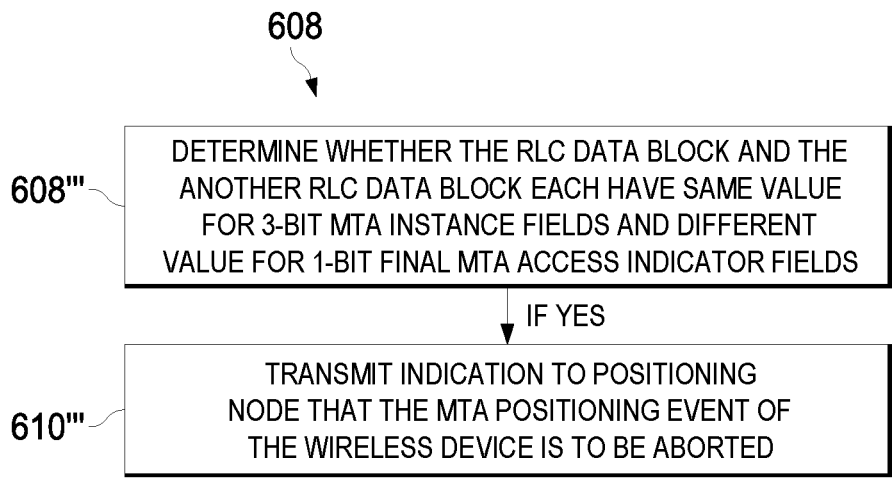
FIG. 6C is a flowchart illustrating yet another way to implement FIG. 6's step of determining whether the MTA procedure of the wireless device has been compromised in accordance with an embodiment of the present disclosure.

Referring to FIG. 6C, there is a flowchart illustrating steps of yet another way that the network node 312 can perform step 608 in accordance with another embodiment of the present disclosure. The network node 312 in determining whether the MTA procedure of the wireless device 304 has been compromised can at step 608''' determine whether the received RLC data block 310 and the received another RLC data block 313 each have a same value for their respective 3-bit MTA Instance fields 306 and a different value for their respective 1-bit Final MTA Access Indicator fields 308, and wherein a determination that the received RLC data block 310 and the received another RLC data block 313 each have the same value for their respective 3-bit MTA Instance fields 306 and a different value for their respective 1-bit Final MTA Access Indicator fields 308 indicates that the MTA procedure of the wireless device 304 has been compromised. The network node 312 in response to determining that the MTA procedure of the wireless device 304 has been compromised at step 610''' transmits an indication to a positioning node 314 (e.g., SMLC 314) that the positioning event of the wireless device 304 is to be aborted.

Figure 7:
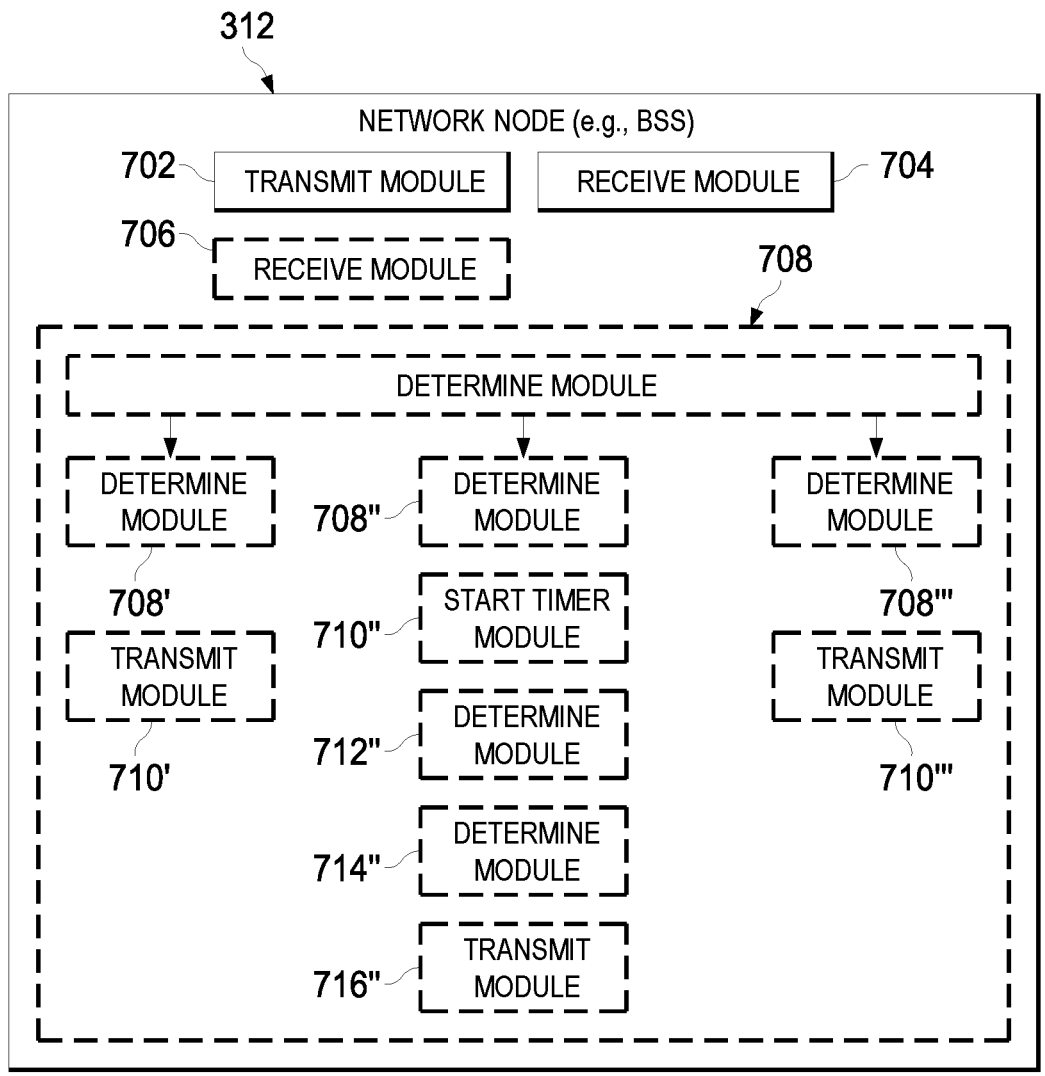
FIG. 7 is a block diagram illustrating a structure of the network node (e.g., BSS) configured in accordance with an embodiment of the present disclosure.

Referring to FIG. 7, there is a block diagram illustrating structures of an exemplary network node 312 (e.g., BSS 312) configured in accordance with an embodiment of the present disclosure. The network node 312 comprises a transmit module 702, a receive module 704, a receive module 706, and a determine module 708. The transmit module 702 is configured to transmit the paging request 403 for a positioning event to the wireless device 304 (see FIG. 3A's step 1) and a subsequent RRLP PDU 405 (Multilateration Timing Advance Request message) (see also FIG. 3B's step 10) (note: upon receiving the paging request 403 and the subsequent RRLP PDU 405, the wireless device 304 performs the positioning event which includes performing a MTA procedure using the RLC Data Block method comprising a plurality of instances). The receive module 704 is configured to receive, from the wireless device 304, the RLC data block 310 which comprises information such as an LLC frame 310a, wireless device (e.g., MS) accuracy information 310b, and TLLI 310c, plus the values in the new 3-bit MTA Instance field 306 and the new 1-bit Final MTA Access Indicator field 308. As described above, the 3-bit MTA Instance field 306 has a value which indicates a position of the instance in a sequence of the plurality of instances, and the 1-bit Final MTA Access Indicator field 308 has a value which indicates whether the instance is a last instance in the sequence of the plurality of instances. The receive module 706 is configured to receive, from the fake wireless device (e.g., MS) 305 which used a same identifier 310c (e.g., TLLI 310c) as the wireless device 304, another RLC data block 313 which comprises information such as a LLC frame 313a, fake wireless device (e.g., MS) accuracy information 313b, and the TLLI 310c plus the values in the new 3-bit MTA Instance field 306 and the new 1-bit Final MTA Access Indicator field 308 (note: the receive module 706 can receive the another RLC data block 313 before or after receive module 702 receives the RLC data block 310). The determine module 708 is configured to determine, based at least on values of the new 3-bit MTA Instance field 306 and the new 1-bit Final MTA Access Indicator field 308 in the received RLC data block 310 and the received another RLC data block 313 whether the MTA procedure of the wireless device 304 has been compromised. A discussion is provided next to describe three ways that the determine module 708 can be configured to determine whether the MTA procedure of the wireless device 304 has been compromised (note: the determine module 708 can be configured to implement any one or all of these different ways to determine whether the MTA procedure of the wireless device 304 has been compromised).

In the first way, the determine module 708 can include a determine module 708' and a transmit module 710'. The determine module 708' is configured to determine whether the received RLC data block 310 and the received another RLC data block 313 each have a same value for their respective 3-bit MTA Instance fields 306 and a same value for their respective 1-bit Final MTA Access Indicator fields 308, and wherein a determination that the received RLC data block 310 and the received another RLC data block 313 each have the same value for their respective 3-bit MTA Instance fields 306 and the same value for their respective 1-bit Final MTA Access Indicator fields 308 indicates that the MTA procedure of the wireless device 304 has been compromised. In response, to determining that the MTA procedure of the wireless device 304 has been compromised, the transmit module 710' is configured to transmit an indication to a positioning node 314 (e.g., SMLC 314) that the positioning event of the wireless device 304 is to be aborted.

In the second way, the determine module 708 can include a determine module 708", a start timer module 710", a determine module 712", a determine module 714", and a transmit module 716". The determine module 708" is configured to determine that one of the received RLC data block 310 or the received another RLC data block 313 has a value for the 3-bit MTA Instance field 306 that is greater than a value of the 3-bit MTA Instance field 306 of the other one of the received RLC data block 310 or the received another RLC data block 313 and where the 1-bit Final MTA Access Indicator field 308 of the other one of the received RLC data block 310 or the received another RLC data block 313 has a value of TRUE, which indicates that instance was the last instance in the sequence of the plurality of instances. After the first or second receive module 702 or 704 receives the other one of the received RLC data block 310 or the received another RLC data block 313 that has the 1-bit Final MTA Access Indicator field 308 with the value of TRUE, the timer start module 710" is configured to start a timer 316. The determine module 712" in response to determining that the timer 316 reached its expiration before receiving the one of the received RLC data block 310 or the received another RLC data block 313 that has the value for its 3-bit MTA Instance field 306 that is greater than the value of the 3-bit MTA Instance field 306 of the other one of the received RLC data block 310 and the received another RLC data block 313 is configured to determine that the MTA procedure of the wireless device 304 is valid. The determine module 714" in response to receiving, before the timer 316 reached its expiration, the one of the received RLC data block 310 or the received another RLC data block 313 that has the value for its 3-bit MTA Instance field 306 that is greater than the value of the 3-bit MTA Instance field 306 of the other one of the received RLC data block 310 or the received another RLC data black 313 is configured to determine that the MTA procedure of the wireless device 304 has been compromised, and the transmit module 716" is configured to transmit an indication to the positioning node 314 (e.g., SMLC 314) that the positioning event of the wireless device 304 is to be aborted.

In the third way, the determine module 708 can include a determine module 708''' and a transmit module 710'''. The determine module 708''' is configured to determine whether the received RLC data block 310 and the received another RLC data block 313 each have a same value for their respective 3-bit MTA Instance fields 306 and a different value for their respective 1-bit Final MTA Access Indicator fields 308, and wherein a determination that the received RLC data block 310 and the received another RLC data block 313 each have the same value for their respective 3-bit MTA Instance fields 306 and a different value for their respective 1-bit Final MTA Access Indicator fields 308 indicates that the MTA procedure of the wireless device 304 has been compromised. In response, to determining that the MTA procedure of the wireless device 304 has been compromised the transmit module 710''' is configured to transmit an indication to a positioning node 314 (e.g., SMLC 314) that the positioning event of the wireless device 304 is to be aborted.

In addition, it should be appreciated that the network node 312 may also include other components, modules or structures which are well-known, but for clarity, only the components, modules or structures needed to describe the features of the present disclosure are described herein.

As those skilled in the art will appreciate, the above-described modules 702, 704, 706, and 708 (including sub-modules 708', 710', 708", 710", 712", 714", 716", 708''' and 710''') of the network node 312 may be implemented as suitable dedicated circuit. Further, the modules 702, 704, 706, and 708 (including sub-modules 708', 710', 708", 710", 712", 714", 716", 708''' and 710''') can also be implemented using any number of dedicated circuits through functional combination or separation. In some embodiments, the modules 702, 704, 706, and 708 (including sub-modules 708', 710', 708", 710", 712", 714", 716", 708''' and 710''') may even be combined in a single application specific integrated circuit (ASIC). As an alternative software-based implementation, the network node 312 may comprise processing circuitry 322 which may comprise a memory, and a processor (including but not limited to a microprocessor, a microcontroller or a Digital Signal Processor (DSP), etc.). The memory stores machine-readable program code executable by the processor to cause the network node 312 to perform the steps of the above-described method 600. In other embodiments, the network node 312 (e.g., BSS 312) may also have a configuration as described hereinafter with respect to FIGS. 8-16).

Additional Explanation

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 8A:
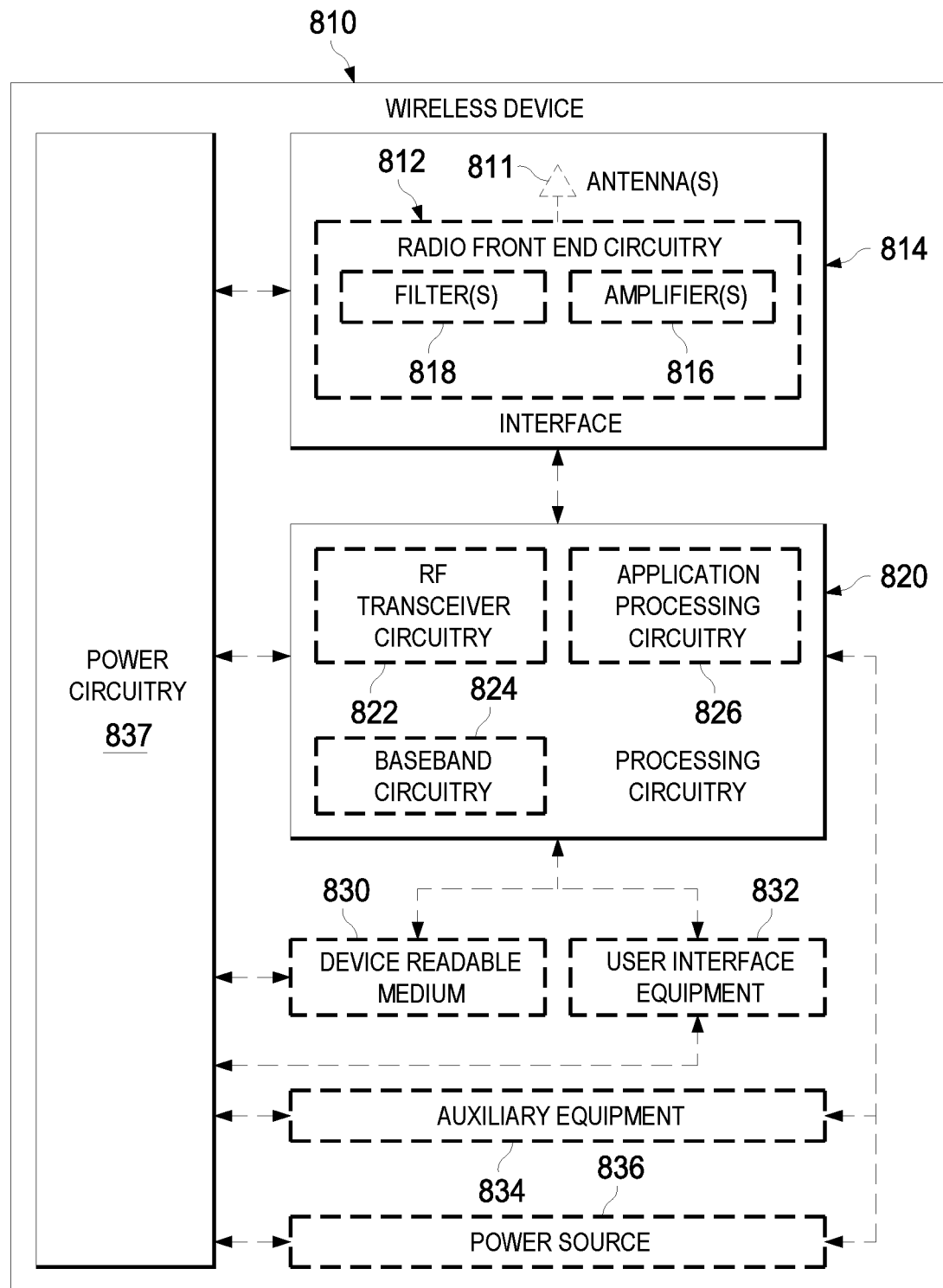
FIGS. 8A-8B are illustrations of a wireless network including a wireless device and network node configured in accordance with an embodiment of the present disclosure.
Figure 8B:
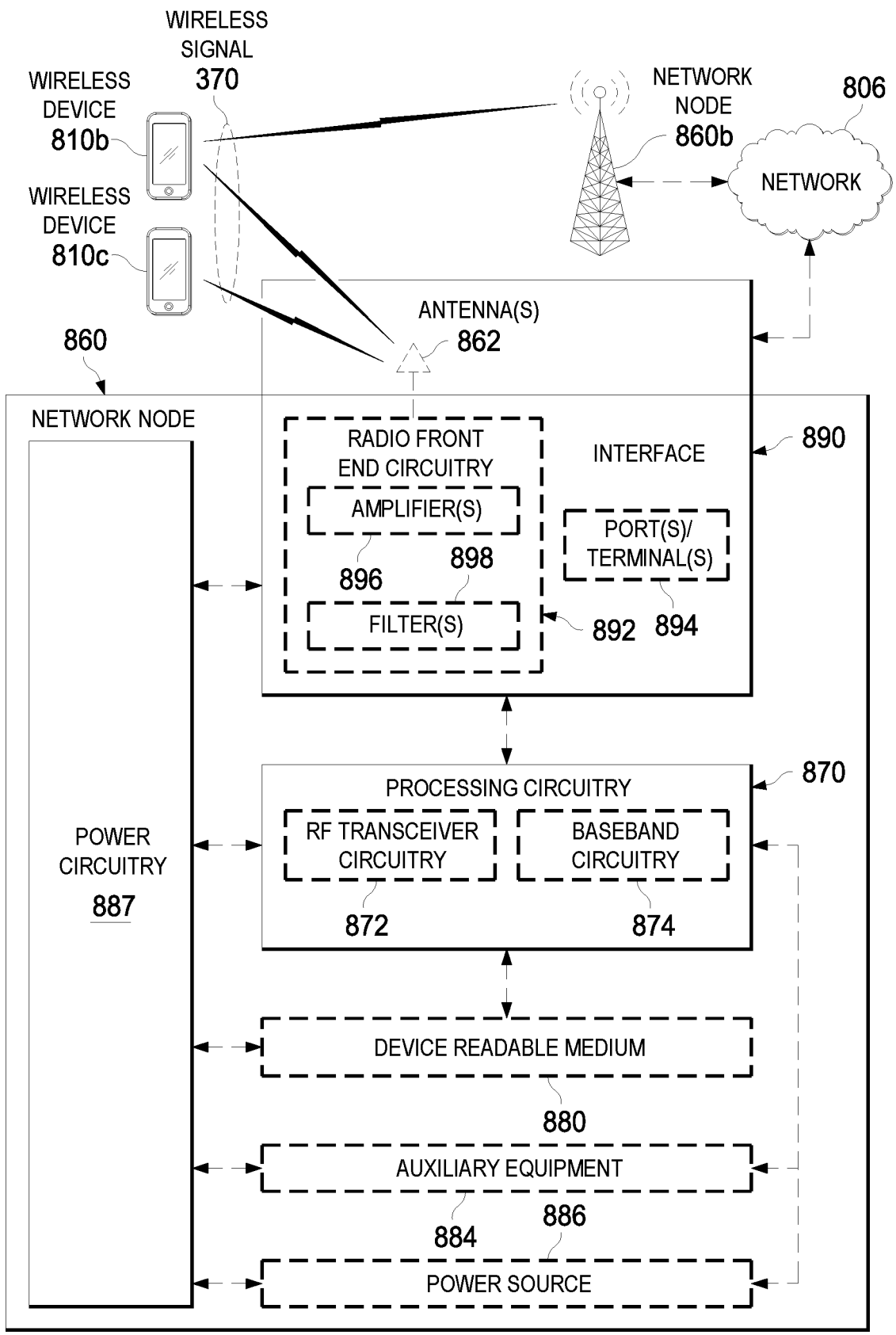

Although the subject matter described herein may be implemented in any appropriate type of system using any suitable components, the embodiments disclosed herein are described in relation to a wireless network, such as the example wireless network illustrated in FIGS. 8A-8B. For simplicity, the wireless network of FIGS. 8A-8B only depicts network 806, network nodes 860 and 860*b*, and WDs 810, 810*b*, and 810*c*. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NRNodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIGS. 8A-8B, network node 860 includes processing circuitry 870, device readable medium 880, interface 890, auxiliary equipment 884, power source 886, power circuitry 887, and antenna 862. Although network node 860 illustrated in the example wireless network of FIGS. 8A-8B may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and an RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signalling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIGS. 8A-8B that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 880, WD 810 functionality. Such functionality may include providing any of the various wireless features or benefits discussed herein. For example, processing circuitry 820 may execute instructions stored in device readable medium 880 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 880, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
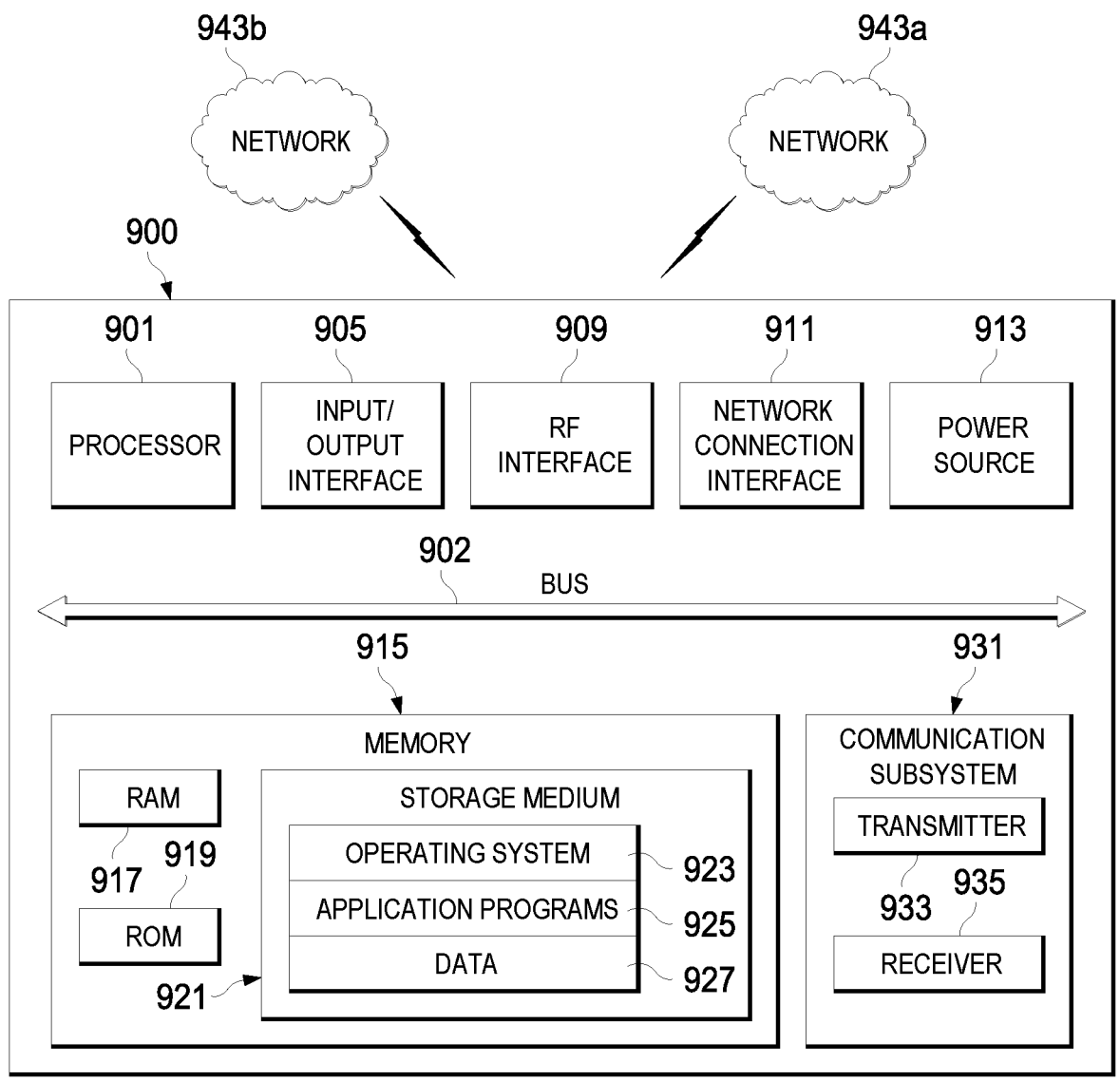
FIG. 9 is an illustration of a User Equipment (e.g., MS, wireless device) configured in accordance with an embodiment of the present disclosure.

FIG. 9 illustrates one embodiment of a UE 900 in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 900 may be any UE identified by the 3$^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943a. Network 943a may encompass wired and/or wireless networks such as a local-area network (LAN), a wide-area network (WAN), a computer network, a wireless network, a telecommunications network, another like network or any combination thereof. For example, network 943a may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943b using communication subsystem 931. Network 943a and network 943b may be the same network or networks or different network or networks. Communication subsystem 931 may be configured to include one or more transceivers used to communicate with network 943b. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.4, CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943b may encompass wired and/or wireless networks such as a local-area network (LAN), a wide-area network (WAN), a computer network, a wireless network, a telecommunications network, another like network or any combination thereof For example, network 943b may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
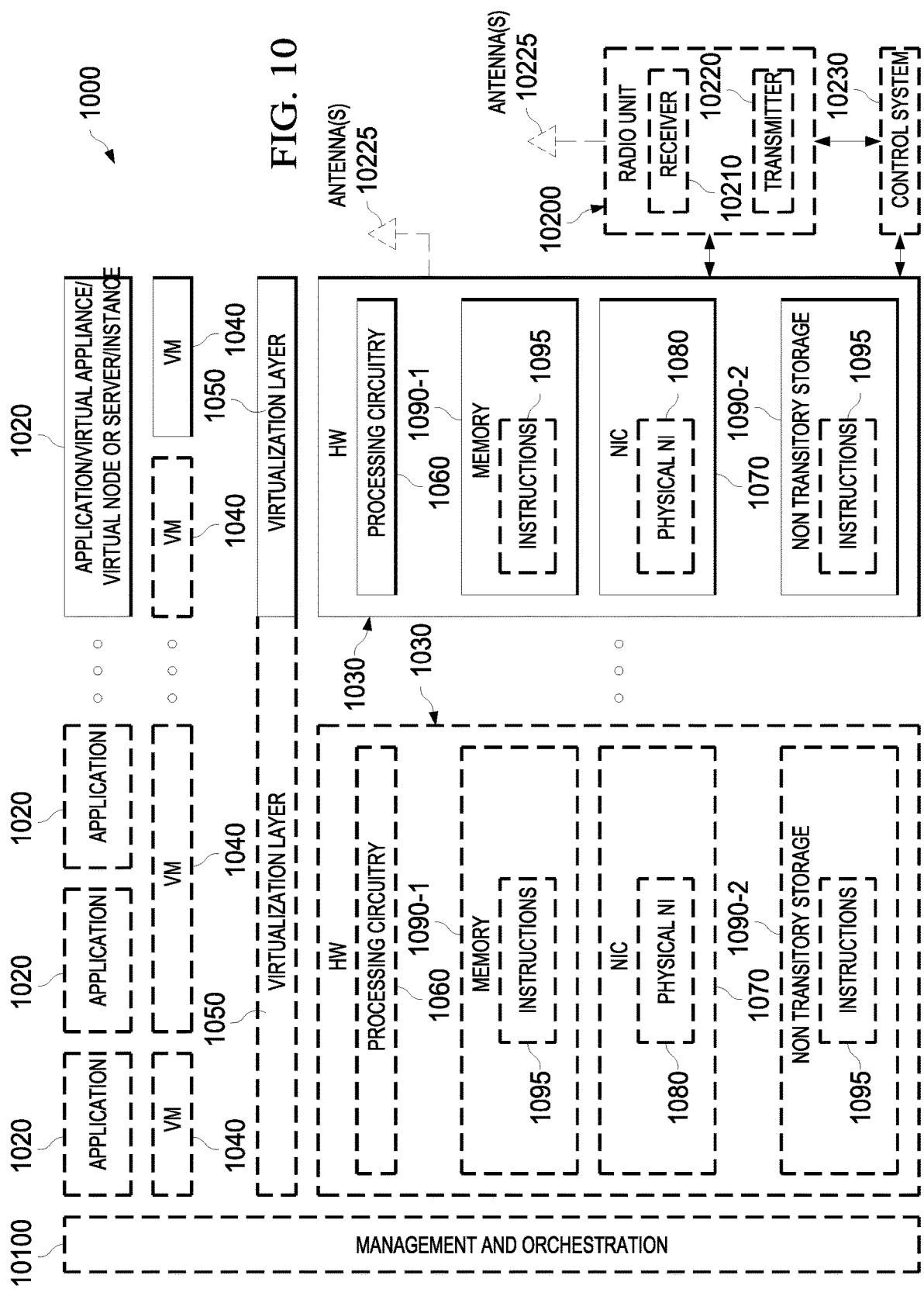
FIG. 10 is an illustration of a virtualization environment in accordance with some embodiments of the present disclosure.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 530 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signalling can be effected with the use of control system 10230 which may alternatively be used for communication between the hardware nodes 1030 and radio units 10200.

Figure 11:
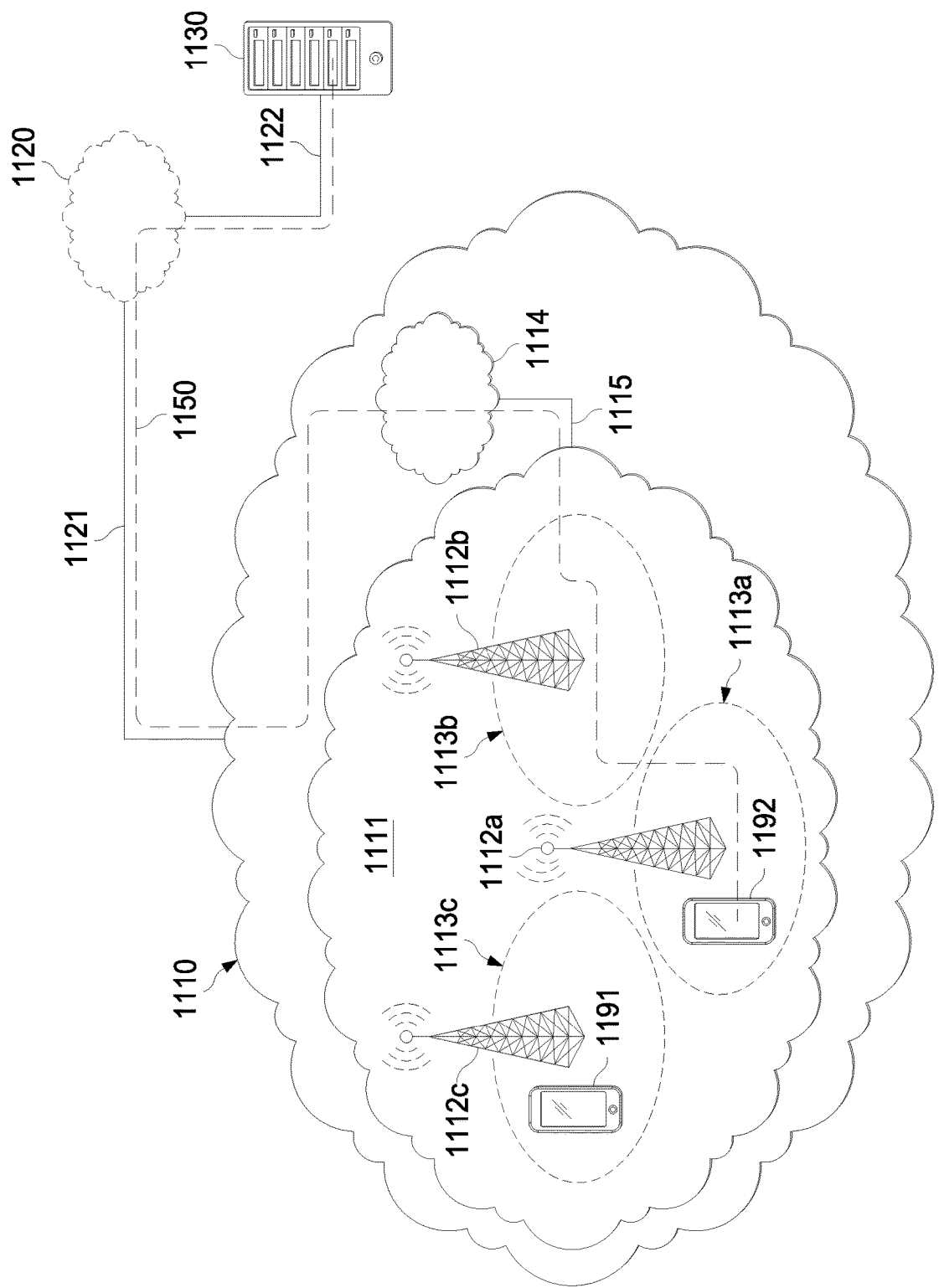
FIG. 11 is an illustration of a telecommunication network connected via an intermediate network to a host computer in accordance with some embodiments of the present disclosure.

With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218.

Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

Figure 12:
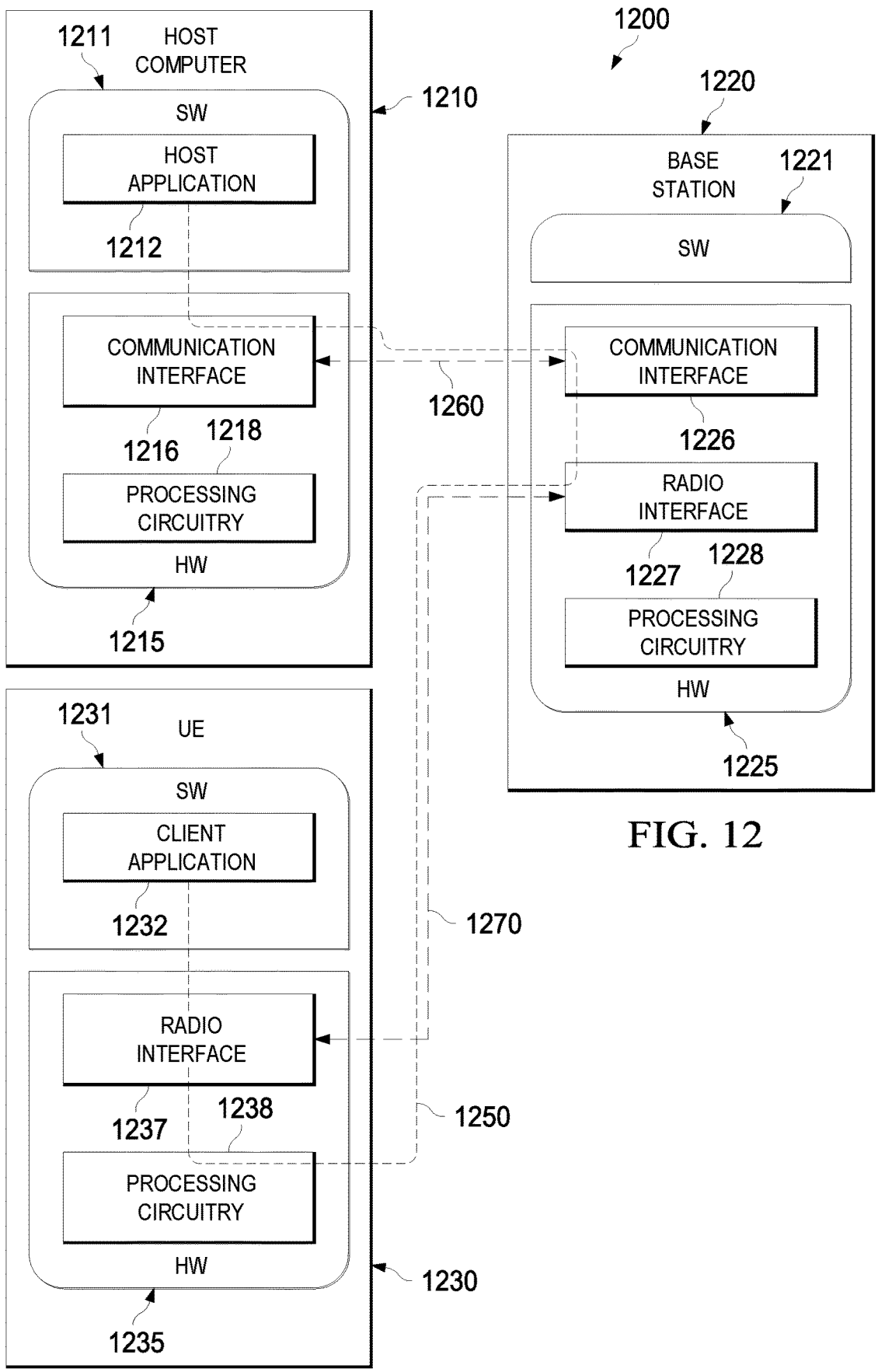
FIG. 12 is an illustration of a host computer communicating via a base station with a user equipment over a partially wireless connection in accordance with some embodiments of the present disclosure.

It is noted that host computer 1210, base station 1220 and UE 1230 illustrated in FIG. 12 may be similar or identical to host computer 1130, one of base stations 1112a, 1112b, 1112c and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve the security in accurate position estimation of the UE 1230 and thereby provide benefits such as increasing security to a user's applications and data; reducing uplink latency which makes a vehicular communication service safer; and conserving uplink transmit energy which extends the lifetime of battery-powered sensors and meters.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figure 13:
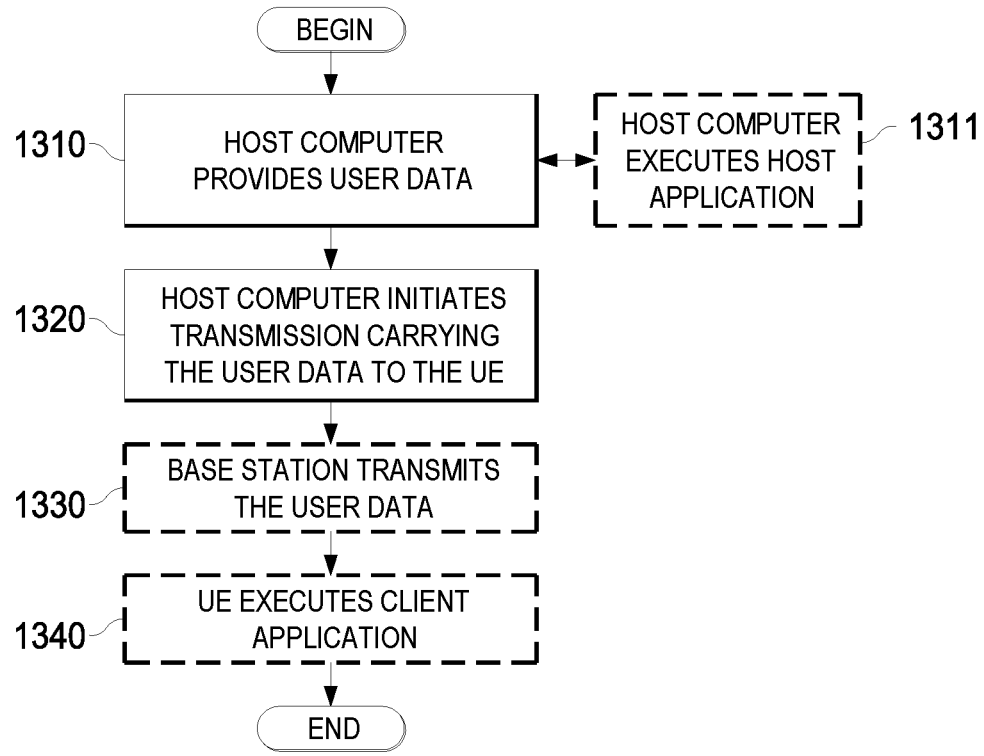
FIG. 13 is an illustration of methods implemented in a communication system including a host computer, a base station and a user equipment in accordance with some embodiments of the present disclosure.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

Figure 14:
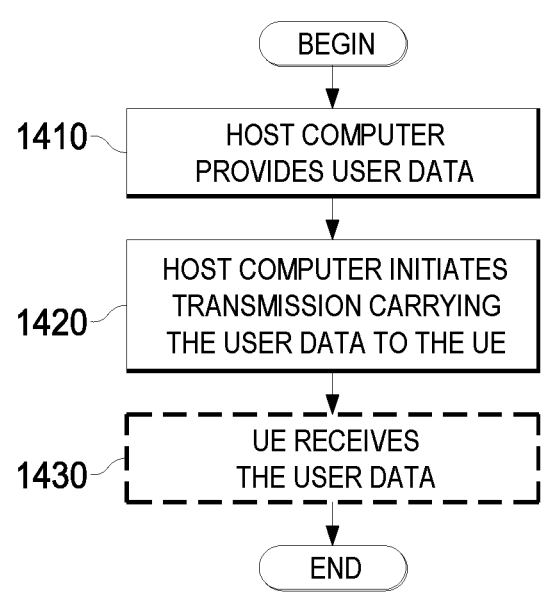
FIG. 14 is an illustration of methods implemented in a communication system including a host computer, a base station and a user equipment in accordance with some embodiments of the present disclosure.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figure 15:
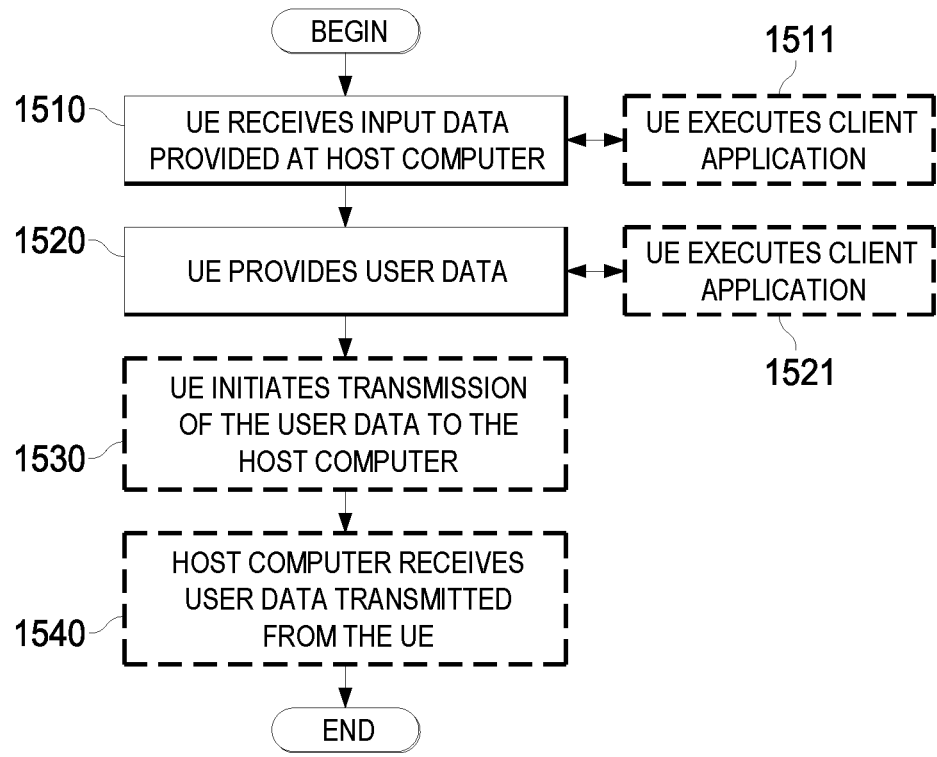
FIG. 15 is an illustration of methods implemented in a communication system including a host computer, a base station and a user equipment in accordance with some embodiments of the present disclosure; and, FIG. 16 is an illustration of methods implemented in a communication system including a host computer, a base station and a user equipment in accordance with some embodiments of the present disclosure.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

Figure 16:
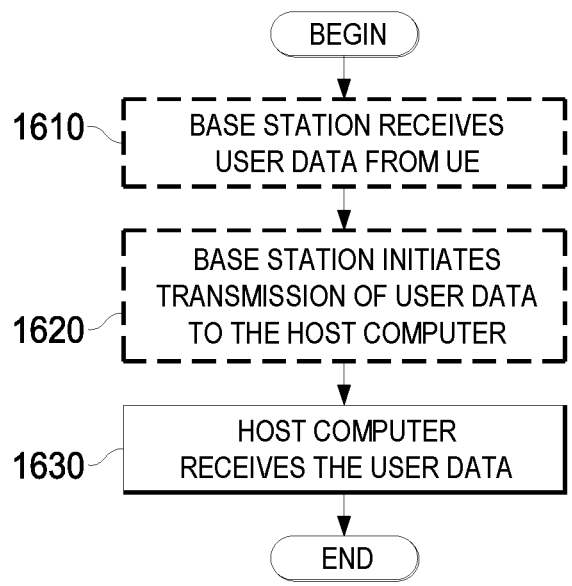

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXEMPLARY EMBODIMENTS

Group A Embodiments

1. A method performed by a wireless device for improved security for positioning without ciphering, the method comprising:
  receiving, for a base station, a paging request for a positioning event; and
  performing an MTA procedure comprising a plurality of instances,
  wherein performing an instance comprises transmitting, to the base station, an RLC data block comprising a first field and a second field, the first field indicating a position of the instance in the sequence of the plurality, and the second field indicating if the instance is the last in the sequence of the plurality.

2. The method of embodiment 1, wherein the first field is a 3-bit field, and the method further comprises:
  incrementing a value of the 3-bit field when performing each consecutive instance in the plurality of instances.

3. The method of embodiment 1, wherein the second field is a 1-bit field, and the method further comprises:
  setting a value of the 1-bit field to TRUE if the instance is the last in the sequence of the plurality of instances; and
  setting a value of the 1-bit field to FALSE if the instance is before the last in the sequence of the plurality of instances.

4. The method of any of the previous embodiments, further comprising:
  providing user data; and
  forwarding the user data to a host computer via the transmission to the base station.

Group B Embodiments

5. A method performed by a base station for improved security for positioning without ciphering, the method comprising:
  transmitting or forwarding a paging request for a positioning event to a wireless device, the positioning event comprising the wireless device performing an MTA procedure comprising a plurality of instances;
  receiving, from the wireless device, a plurality of RLC data blocks, wherein each RLC data block comprises a first field and a second field, the first field indicating a position of an instance in the sequence of the plurality, and the second field indicating if the instance is the last in the sequence of the plurality; and
  determining, based at least on the first field and the second field in the plurality of RLC data blocks received from the wireless device, whether the MTA procedure of the wireless device has been compromised.

6. The method of embodiment 5, wherein determining whether the MTA procedure of the wireless device has been compromised further comprises:
   determining if two RLC data blocks of the plurality of RLC data blocks received from the wireless device have a same value for their respective first fields and a same value for their respective second fields,
   wherein a determination that the two RLC data blocks have a same value for their respective first fields and a same value for their respective second fields indicates that the MTA procedure of the wireless device has been compromised.

7. The method of embodiment 5, wherein determining whether the MTA procedure of the wireless device has been compromised further comprises:
   determining if two RLC data blocks of the plurality of RLC data blocks received from the wireless device have a same value for their respective first fields and different values for their respective second fields,
   wherein a determination that the two RLC data blocks have the same value for their respective first fields and different values for their respective second fields indicates that the MTA procedure of the wireless device has been compromised.

8. The method of any of embodiments 5-7, further comprising:
   in response to determining that the MTA procedure of the wireless device has been compromised, transmitting an indication to the SMLC that the positioning event of the wireless device is to be aborted.

9. The method of embodiment 5, wherein determining whether the MTA procedure of the wireless device has been compromised further comprises:
   determining if an RLC data block received from the wireless device has a value for its first field that is greater than a value of the first field of a different RLC data block received from the wireless device, wherein the second field of the different RLC data block had a value of TRUE, which indicates the instance was the last in the sequence of the plurality,
   wherein a determination that the RLC data block received has a value for its first field that is greater than the value of the first field of the different RLC data block indicates that the MTA procedure of the wireless device has been compromised.

10. The method of embodiment 9, further comprising:
   after receiving from the wireless device the different RLC data block that has a value of TRUE for its second field, setting a timer;
   in response to determining that the timer reached its expiration before receiving from the wireless device an RLC data block that has a value for its first field that is greater than the value of the first field of the different RLC data block, determining that the MTA procedure of the wireless device is valid;
   in response to receiving from the wireless device, before the timer reached its expiration, the RLC data block that has the value for its first field that is greater than the value of the first field of the different RLC data block, determining that the MTA procedure of the wireless device has been compromised; and
   transmitting an indication to the SMLC that the positioning event of the wireless device is to be aborted.

11. The method of embodiment 10, wherein a value of expiration of the timer is one or more of: (i) fixed, (ii) indicated using system information; and (iii) reflects a worst case delay expected between any two consecutive RLC data block transmissions made by the wireless device performing the MTA procedure using the RLC Data Block method.

12. The method of any of the previous embodiments, further comprising:
   obtaining user data; and
   forwarding the user data to a host computer or a wireless device.

Group C Embodiments

13. A wireless device for improved security for positioning without ciphering, the wireless device comprising:
   processing circuitry configured to perform any of the steps of any of the Group A embodiments; and
   power supply circuitry configured to supply power to the wireless device.

14. A base station for improved security for positioning without ciphering, the base station comprising:
   processing circuitry configured to perform any of the steps of any of the Group B embodiments;
   power supply circuitry configured to supply power to the wireless device.

15. A user equipment (UE) for improved security for positioning without ciphering, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.

16. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments.

17. The communication system of the pervious embodiment further including the base station.

18. The communication system of the previous 2 embodiments, further including the UE, wherein the UE is configured to communicate with the base station.

19. The communication system of the previous 3 embodiments, wherein:
   the processing circuitry of the host computer is configured to execute a host application, thereby providing the user data; and
   the UE comprises processing circuitry configured to execute a client application associated with the host application.

20. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

21. The method of the previous embodiment, further comprising, at the base station, transmitting the user data.

22. The method of the previous 2 embodiments, wherein the user data is provided at the host computer by executing a host application, the method further comprising, at the UE, executing a client application associated with the host application.

23. A user equipment (UE) configured to communicate with a base station, the UE comprising a radio interface and processing circuitry configured to performs the of the previous 3 embodiments.

24. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

25. The communication system of the previous embodiment, wherein the cellular network further includes a base station configured to communicate with the UE.

26. The communication system of the previous 2 embodiments, wherein:

the processing circuitry of the host computer is configured to execute a host application, thereby providing the user data; and the UE's processing circuitry is configured to execute a client application associated with the host application.

27. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

28. The method of the previous embodiment, further comprising at the UE, receiving the user data from the base station.

29. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

30. The communication system of the previous embodiment, further including the UE.

31. The communication system of the previous 2 embodiments, further including the base station, wherein the base station comprises a radio interface configured to communicate with the UE and a communication interface configured to forward to the host computer the user data carried by a transmission from the UE to the base station.

32. The communication system of the previous 3 embodiments, wherein:

the processing circuitry of the host computer is configured to execute a host application; and the UE's processing circuitry is configured to execute a client application associated with the host application, thereby providing the user data.

33. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

34. A method implemented in a communication system including a host computer, a base station and a user equipment (UE), the method comprising:

at the host computer, receiving user data transmitted to the base station from the UE, wherein the UE performs any of the steps of any of the Group A embodiments.

35. The method of the previous embodiment, further comprising, at the UE, providing the user data to the base station.

36. The method of the previous 2 embodiments, further comprising:

at the UE, executing a client application, thereby providing the user data to be transmitted; and at the host computer, executing a host application associated with the client application.

37. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

38. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

39. The communication system of the previous embodiment further including the base station.

40. The communication system of the previous 2 embodiments, further including the UE, wherein the UE is configured to communicate with the base station.

41. The communication system of the previous 3 embodiments, wherein:

the processing circuitry of the host computer is configured to execute a host application;

the UE is configured to execute a client application associated with the host application, thereby providing the user data to be received by the host computer.

42. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

43. The method of the previous embodiment, further comprising at the base station, receiving the user data from the UE.

44. The method of the previous 2 embodiments, further comprising at the base station, initiating a transmission of the received user data to the host computer.

REFERENCES

1. RP-161260, "New Work Item on Positioning Enhancements for GERAN", source Ericsson, Orange, MediaTek Inc., Sierra Wireless, Nokia, 3GPP TSG RAN#72, Busan, Korea, Jun. 13-16, 2016.
2. RP-161034, "Positioning Enhancements for GERAN introducing TA trilateration", source Ericsson, 3GPP TSG RAN#72, Busan, Korea, Jun. 13-16, 2016.
3. R6-170200, "On Security of the MTA Method for Position Estimation", source Nokia, 3GPP TSG RAN WB6 #4, Hangzhou, P. R. China, May 15-19, 2017.
4. R6-170289, "Solving the Security Threat for MTA Positioning Methods", source Ericsson, 3GPP TSG RAN WB6 #4, Hangzhou, P. R. China, May 15-19, 2017.
5. R6-170045, "Serving Cell TA Estimation for Multilateration Positioning", source Nokia, 3GPP TSG WB6 #3, Athens, Greece, Feb. 13-17, 2017.
6. 3GPP TS 44.060 v14.2.0 (August 2017).
7. 3GPP TS 44.031 v14.2.0 (September 2017).
8. 3GPP TS 49.031 v14.2.0 (September 2017).

Note: The content of these references is hereby incorporated herein for all purposes.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1×Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
BTS Base Transceiver Station
BSS Base Station Subsystem
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
ECGI Evolved CGI
EC-GSM-IoT Extended Coverage GSM-IoT
EDGE Enhanced Data rates for GSM Evolution
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GPRS General Packet Radio Service
GSM Global System for Mobile communication
HARQ Hybrid Automatic Repeat Request
HO Handover
HSPA High Speed Packet Access
HRPD High Rate Packet Data
IoT Internet of Things
LLC Logical Link Control
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MS Mobile Station
MSC Mobile Switching Center
MTA Multilateration Timing Advance
MTC Machine Type Communication
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PDU Protocol Data Unit
PEO Power Efficient Operation
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation RAN Radio Access Network
RAT Radio Access Technology
RLC Radio Link Control
RLM Radio Link Management
RNC Radio Network Controller
RNTI Radio Network Temporary Identifier
RRC Radio Resource Control
RRLP Radio Resource Location Services Protocol
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGSN Serving GPRS Support Node
SGW Serving Gateway
SI System Information
SIB System Information Block
SMLC Serving Mobile Location Center
SNR Signal to Noise Ratio
SON Self Optimized Network
SS Synchronization Signal
SSS Secondary Synchronization Signal
TA Timing Advance
TBF Temporary Block Flow
TDD Time Division Duplex
TDOA Time Difference of Arrival
TLLI Temporary Logical Link Identifier
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network In view of the foregoing, it should be appreciated that embodiments described herein are illustrated by exemplary embodiments. It should also be appreciated that these embodiments are not mutually exclusive. That is, the components from one embodiment may be tacitly assumed to be present in another embodiment and it will be obvious to a person skilled in the art how those components may be used in the other exemplary embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description. Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that has been set forth and defined within the following claims.

The invention claimed is:

1. A Mobile Station (MS) configured to interact with a Base Station Subsystem (BSS), the MS comprising:
   processing circuitry configured to cause the MS to perform the following operations:
      receive, from the BSS, a paging request for a positioning event and a subsequent Radio Resource Location Services Protocol (RRLP) Protocol Data Unit (PDU); and
      perform, in response to receipt of the paging request and the RRLP PDU, a Multilateration Timing Advance (MTA) procedure using a Radio Link Control (RLC) Data Block Method comprising a plurality of instances; and,
   further characterized by performance of each instance comprising transmitting, to the BSS, a RLC data block comprising at least a first field and a second field, the first field indicating a position of the instance in a sequence of the plurality of instances, and the second field indicating whether the instance is a last instance in the sequence of the plurality of instances.

2. The MS of claim 1, wherein the first field is a 3-bit field, and the MS performs the following operation:
increment a value of the 3-bit field when performing each consecutive instance in the plurality of instances.

3. The MS of claim 1, wherein the second field is a 1-bit field, and the MS further performs the following operations:
set a value of the 1-bit field to TRUE when the instance is the last instance in the sequence of the plurality of instances; and
set a value of the 1-bit field to FALSE when the instance is not the last instance in the sequence of the plurality of instances.

4. A method performed by a Mobile Station (MS) which interacts with a Base Station Subsystem (BSS), the method comprising:
receiving, from the BSS, a paging request for a positioning event and a subsequent Radio Resource Location Services Protocol (RRLP) Protocol Data Unit (PDU); and
performing, in response to receiving the paging request and the RRLP PDU, a Multilateration Timing Advance (MTA) procedure using a Radio Link Control (RLC) Data Block Method comprising a plurality of instances; and,
further characterized by performance of each instance comprising transmitting, to the BSS, a RLC data block comprising at least a first field and a second field, the first field indicating a position of the instance in a sequence of the plurality of instances, and the second field indicating whether the instance is a last instance in the sequence of the plurality of instances.

5. The method of claim 4, wherein the first field is a 3-bit field, and the method further comprises:
incrementing a value of the 3-bit field when performing each consecutive instance in the plurality of instances.

6. The method of claim 4, wherein the second field is a 1-bit field, and the method further comprises:
setting a value of the 1-bit field to TRUE when the instance is the last instance in the sequence of the plurality of instances; and
setting a value of the 1-bit field to FALSE when the instance is not the last instance in the sequence of the plurality of instances.

7. A Base Station Subsystem (BSS) which interacts with a Mobile Station (MS), the BSS comprising:
processing circuitry configured to cause the BSS to perform the following operation:
transmit a paging request for a positioning event and a subsequent Radio Resource Location Services Protocol (RRLP) Protocol Data Unit (PDU) to the MS, the positioning event comprising the MS performing a Multilateration Timing Advance (MTA) procedure using a Radio Link Control (RLC) Data Block Method comprising a plurality of instances; and,
further characterized by the processing circuitry configured to cause the BSS to perform the following operation:
receive, from the MS, an RLC data block comprising a first field and a second field, the first field indicating a position of the instance in a sequence of the plurality of instances, and the second field indicating whether the instance is a last instance in the sequence of the plurality of instances.

8. The BSS of claim 7, wherein the BSS performs the following operations:
receive, from another MS which used a same identifier as the MS, another RLC data block comprising a first field and a second field, the first field indicating a position of the instance in a sequence of the plurality of instances, and the second field indicating whether the instance is a last instance in the sequence of the plurality of instances; and
determine, based at least on values of the first fields and the second fields in the received RLC data block and the received another RLC data block whether the MTA procedure of the MS has been compromised.

9. The BSS of claim 8, wherein the operation to determine whether the MTA procedure of the MS has been compromised further comprises:
determine whether the received RLC data block and the received another RLC data block each have a same value for their respective first fields and a same value for their respective second fields; and,
wherein a determination that the received RLC data block and the received another RLC data block each have the same value for their respective first fields and the same value for their respective second fields indicates that the MTA procedure of the MS has been compromised.

10. The BSS of claim 9, wherein the BSS performs the following operation:
in response to determining that the MTA procedure of the MS has been compromised, transmit an indication to a positioning node that the positioning event of the MS is to be aborted.

11. The BSS of claim 8, wherein the operation of determining whether the MTA procedure of the MS has been compromised further comprises:
determine that one of the received RLC data block or the received another RLC data block has a value for the first field that is greater than a value of the first field of the other one of the received RLC data block or the received another RLC data block and where the second field of the other one of the received RLC data block or the received another RLC data block has a value of TRUE which indicates the instance was the last instance in the sequence of the plurality of instances.

12. The BSS of claim 11, wherein the BSS performs the following operations:
after receiving the other one of the received RLC data block or the received another RLC data block that has the second field with the value of TRUE, start a timer;
in response to determining that the timer reached its expiration before receiving the one of the received RLC data block or the received another RLC data block that has the value for its first field that is greater than the value of the first field of the other one of the received RLC data block or the received another RLC data block, determine that the MTA procedure of the MS is valid; and
in response to receiving, before the timer reached its expiration, the one of the received RLC data block or the received another RLC data block that has the value for its first field that is greater than the value of the first field of the other one of the received RLC data block or the received another RLC data block, determine that the MTA procedure of the MS has been compromised, and transmit an indication to a positioning node that the positioning event of the MS is to be aborted.

13. The BSS of claim 8, wherein the operation of determining whether the MTA procedure of the MS has been compromised further comprises:

determine whether the received RLC data block and the received another RLC data block each have a same value for their respective first fields and different values for their respective second fields; and, wherein a determination that the received RLC data block and the received another RLC data block each have the same value for their respective first fields and the different values for their respective second fields indicates that the MTA procedure of the MS has been compromised.

14. The BSS of claim 13, wherein the BSS performs the following operation:
in response to determining that the MTA procedure of the MS has been compromised, transmit an indication to a positioning node that the positioning event of the MS is to be aborted.

15. A method performed by a Base Station Subsystem (BSS) which interacts with a Mobile Station (MS), the method comprising:
transmitting a paging request for a positioning event and a subsequent Radio Resource Location Services Protocol (RRLP) Protocol Data Unit (PDU) to the MS, the positioning event comprising the MS performing a Multilateration Timing Advance (MTA) procedure using a Radio Link Control (RLC) Data Block Method comprising a plurality of instances; and,
further characterized by receiving, from the MS, a RLC data block comprising a first field and a second field, the first field indicating a position of the instance in a sequence of the plurality of instances, and the second field indicating whether the instance is a last instance in the sequence of the plurality of instances.

16. The method of claim 15, further comprising:
receiving, from another MS which used a same identifier as the MS, another RLC data block comprising a first field and a second field, the first field indicating a position of the instance in a sequence of the plurality of instances, and the second field indicating whether the instance is a last instance in the sequence of the plurality of instances; and
determining, based at least on values of the first fields and the second fields in the received RLC data block and the received another RLC data block whether the MTA procedure of the MS has been compromised.

17. The method of claim 16, wherein determining whether the MTA procedure of the MS has been compromised further comprises:
determining whether the received RLC data block and the received another RLC data block each have a same value for their respective first fields and a same value for their respective second fields; and,
wherein a determination that the received RLC data block and the received another RLC data block each have the same value for their respective first fields and the same value for their respective second fields indicates that the MTA procedure of the MS has been compromised.

18. The method of claim 17, further comprising:
in response to determining that the MTA procedure of the MS has been compromised, transmitting an indication to a positioning node that the positioning event of the MS is to be aborted.

19. The method of claim 16, wherein determining whether the MTA procedure of the MS has been compromised further comprises:
determining that one of the received RLC data block or the received another RLC data block has a value for the first field that is greater than a value of the first field of the other one of the received RLC data block or the received another RLC data block and where the second field of the other one of the received RLC data block or the received another RLC data block has a value of TRUE which indicates the instance was the last instance in the sequence of the plurality of instances.

20. The method of claim 19, further comprising:
after receiving the other one of the received RLC data block or the received another RLC data block that has the second field with the value of TRUE, starting a timer;
in response to determining that the timer reached its expiration before receiving the one of the received RLC data block or the received another RLC data block that has the value for its first field that is greater than the value of the first field of the other one of the received RLC data block or the received another RLC data block, determining that the MTA procedure of the MS is valid;
in response to receiving, before the timer reached its expiration, the one of the received RLC data block or the received another RLC data block that has the value for its first field that is greater than the value of the first field of the other one of the received RLC data block or the received another RLC data block, determining that the MTA procedure of the MS has been compromised, and transmitting an indication to a positioning node that the positioning event of the MS is to be aborted.

21. The method of claim 16, wherein determining whether the MTA procedure of the MS has been compromised further comprises:
determining whether the received RLC data block and the received another RLC data block each have a same value for their respective first fields and different values for their respective second fields; and,
wherein a determination that the received RLC data block and the received another RLC data block each have the same value for their respective first fields and the different values for their respective second fields indicates that the MTA procedure of the MS has been compromised.

22. The method of claim 21, further comprising:
in response to determining that the MTA procedure of the MS has been compromised, transmitting an indication to a positioning node that the positioning event of the MS is to be aborted.

* * * * *